United States Patent
Keeler et al.

(10) Patent No.: US 8,099,321 B2
(45) Date of Patent: Jan. 17, 2012

(54) SYSTEM AND METHOD OF USER ACCESS SERVICE LEVELS IN A DISTRIBUTED NETWORK COMMUNICATION SYSTEM

(75) Inventors: James D. Keeler, Austin, TX (US); Ian M. Fink, Austin, TX (US); Matthew M. Krenzer, Cedar Park, TX (US)

(73) Assignee: Wayport, Inc., Irving, TX (US)

( * ) Notice: Subject to any disclaimer, the term of this patent is extended or adjusted under 35 U.S.C. 154(b) by 1065 days.

(21) Appl. No.: 11/953,581

(22) Filed: Dec. 10, 2007

(65) Prior Publication Data

US 2008/0089295 A1    Apr. 17, 2008

Related U.S. Application Data

(63) Continuation of application No. 10/387,337, filed on Mar. 11, 2003, now Pat. No. 7,856,659, which is a continuation-in-part of application No. 10/341,761, filed on Jan. 14, 2003, now abandoned.

(60) Provisional application No. 60/383,827, filed on May 29, 2002.

(51) Int. Cl.
*G06Q 10/00* (2006.01)
*G06Q 30/00* (2006.01)
(52) U.S. Cl. .................................................. 705/7.35
(58) Field of Classification Search ................ 705/7.35
See application file for complete search history.

(56) References Cited

U.S. PATENT DOCUMENTS

| 5,802,502 A * | 9/1998 | Gell et al. ................... 705/37 |
| 2002/0071536 A1* | 6/2002 | Boutwell et al. ......... 379/115.01 |
| 2003/0120763 A1* | 6/2003 | Volpano ....................... 709/223 |

OTHER PUBLICATIONS

Molta, Dave "WLAN Security on the Rise—There are no Easy Answers Yet for Ensuring Authentication, Privacy, and Authorization on Wireless LANs, but the Future Looks a Bit Less Scary." Network Computing, p. 86. Feb. 4, 2002.*

* cited by examiner

*Primary Examiner* — John Hayes
*Assistant Examiner* — Allen J Jung
(74) *Attorney, Agent, or Firm* — Yudell Isidore Ng Russell PLLC

(57) ABSTRACT

A system and method uses a plurality of access points coupled to a network, wherein at least one of the plurality of access points is operable to communicate with a computing device, and a network provider server communicatively coupled to a network. The network provider server is operable to perform initiating communication between a computing device and a network, wherein the computing device is coupled to the network through an access point of the plurality of access points at a geographic location, determining different levels of services apply at the venue, presenting one or more of the different levels of services for selection by a user of the computing device, and delivering a level of service selected by the user, among the different levels of services, over the network to the computing device.

20 Claims, 11 Drawing Sheets

| Identification information 1 | Network provider 1 | Access method/destination 1 Access level 1 |
| --- | --- | --- |
| Identification information 2 | Network provider 2 | Access method/destination 2 Access level 2 |
| Identification information 3 | Network provider 3 | Access method/destination 3 Access level 3 |
| Identification information 4 | Network provider 4 | Access method/destination 4 Access level 4 |
| Identification information 5 | Network provider 5 | Access method/destination 5 Access level 5 |

Fig. 5

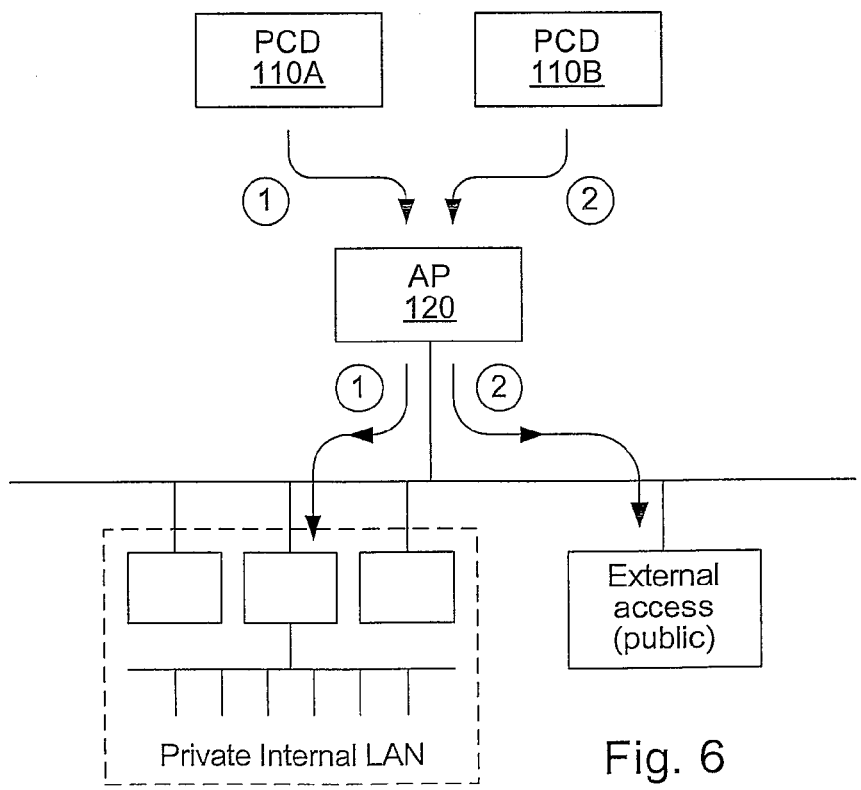

Fig. 6

SYSTEM AND METHOD OF USER ACCESS SERVICE LEVELS IN A DISTRIBUTED NETWORK COMMUNICATION SYSTEM

PRIORITY CLAIM

This application is a continuation of U.S. patent application Ser. No. 10/387,337, titled "System and Method for User Access to a Distributed Network Communication System Using Persistent Identification of Subscribers," filed on Mar. 11, 2003 now U.S. Pat. No. 7,856,659, which is a continuation-in-part of U.S. patent application Ser. No. 10/341,761 titled "Authorization And Authentication Of User Access To A Distributed Network Communication System With Roaming Features" filed on Jan. 14, 2003 now abandoned, which claims benefit of priority of provisional application Ser. No. 60/383,827 titled "Roaming" filed on May 29, 2002.

BACKGROUND OF THE INVENTION

1. Field of the Invention

This invention relates generally to network communications, and more specifically to a system and method enabling a network infrastructure to support multiple network providers and/or customers of multiple network providers.

2. Description of the Relevant Art

Various types of wired and wireless infrastructures are being developed to provide High-speed Internet Access (HSIA) to users of computing devices, such as portable computing devices (PCDs). Currently, numerous providers are attempting to install wired and wireless network infrastructures in various locations, such as airports, hotels, office buildings, etc. for use by various users. Many of these providers also provide subscription services to customers. These subscription services provide the end user with a single bill at the end of the month for all of his or her uses (or, in some cases provide for a pre-paid subscription service). The subscription may be provided by a HSIA network infrastructure provider, or the subscription may be provided by an "aggregator" that does not own or operate any networks, but provides infrastructure for enabling their customers to gain access at sites from one or more HSIA network providers. The party that has the end-user billing relationship is referred to herein as a "subscriber-owner" or "roaming partner."

Subscriber-owners often desire to provide services to their customers at a large number of locations, including locations that are not necessarily owned or operated by the subscriber-owner. Providing such subscription services at a locations not owned or operated by the subscriber-owner is often referred to as "roaming," and the subscriber is said to "roam" onto a third party network.

Roaming technology has been developed in other fields outside of HSIA such as telephone, cellular telephone, and dial-up Internet services. Roaming is a familiar term in cellular telephone networks in situations where a customer of one carrier may arrive in a region where the carrier does not have a physical presence but another provider has equipment. The customer connects to the third-party system and "roams" onto this network. The charges are automatically accumulated by the subscriber-owner and posted on the customer's monthly invoice. In the early days of cellular telephones, roaming was quite awkward. For example, to roam in some areas, a customer would have to dial a local number to inform the local carrier that the customer was in the carrier's region. This awkwardness was due to the fact that no standard mechanism or technology for exchange of credentials or billing information had been adopted. Today roaming in cellular telephone networks is nearly universal between all carriers. More importantly, it is convenient and unobtrusive for the end-users.

In an a situation analogous to the early days of roaming in cellular telephone networks, HSIA providers and subscriber-owners face a challenge of providing roaming services to their customers. At the present point in time, no standard has been adopted for exchange of credentials and billing information. Whereas there is a large amount of technology available for roaming in cellular telephone networks and dial-up ISPs, the mechanism for HSIA connections is quite different than either of these existing systems. HSIA connections are normally controlled via an access control list mechanism with a web-browser. In some cases, client software can also be used to aid in the connection process.

BRIEF DESCRIPTION OF THE DRAWINGS

Other objects and advantages of the invention will become apparent upon reading the following detailed description and upon reference to the accompanying drawings in which:

FIG. 5 illustrates an example of a data structure which stores network provider and access information according to one embodiment;

FIG. 6 illustrates selectively allowing access to a wireless network system using various access levels according to one embodiment;

Figure 1:
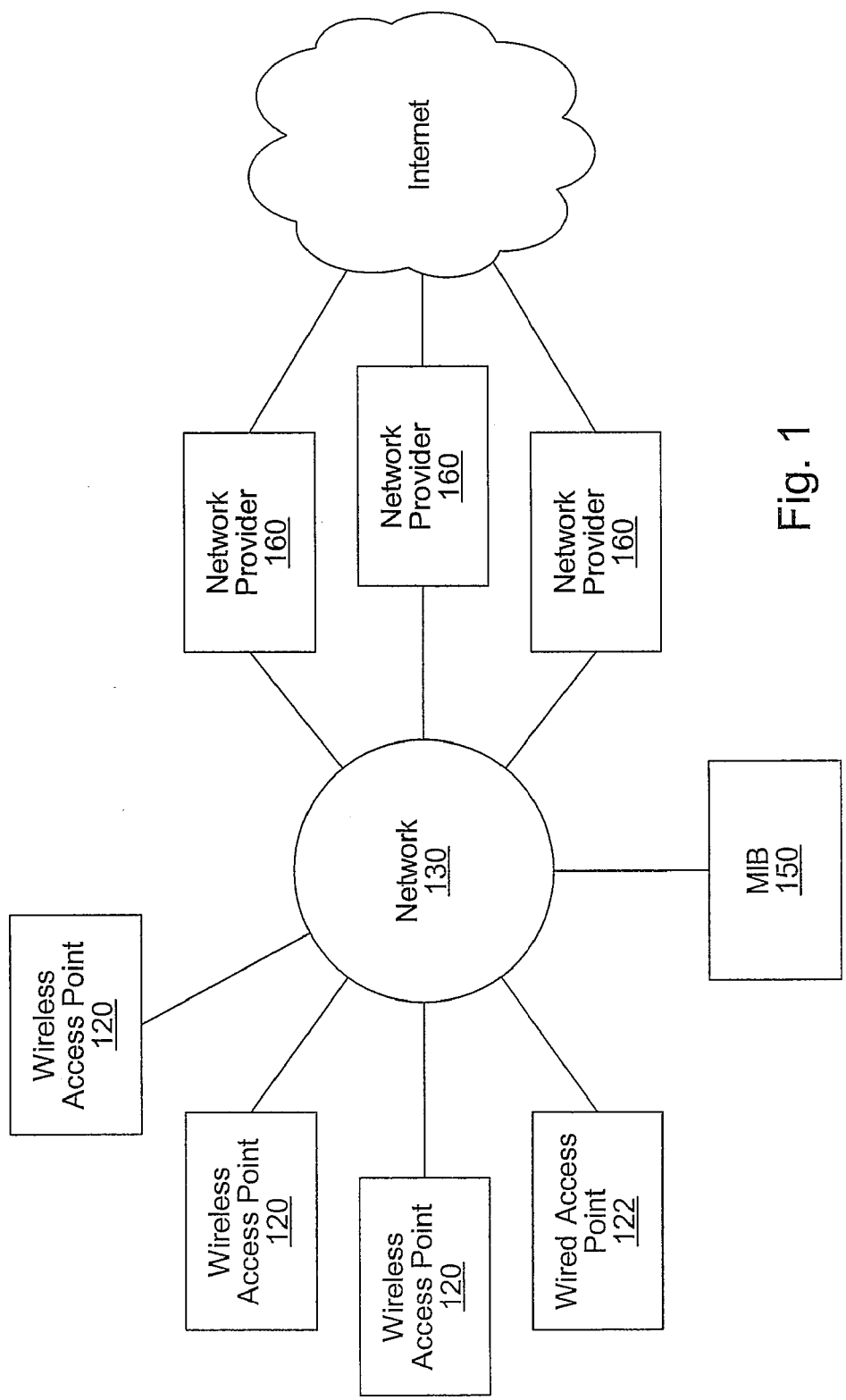
FIG. 1 is a block diagram of one embodiment of a wireless network system according to one embodiment.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE EMBODIMENTS

Incorporation by Reference

U.S. Pat. No. 5,835,061, titled "Method and Apparatus for Geographic-Based Communications Service", whose inventor is Brett B. Stewart, is hereby incorporated by reference in its entirety as though fully and completely set forth herein.

U.S. Pat. No. 5,969,678, titled "System for Hybrid Wired and Wireless Geographic-Based Communications Service", whose inventor is Brett B. Stewart, is hereby incorporated by reference in its entirety as though fully and completely set forth herein.

U.S. patent application Ser. No. 09/433,817 titled "Geographic Based Communications Service" and filed on Nov. 3, 1999, whose inventors are Brett B. Stewart and James Thompson, is hereby incorporated by reference in its entirety as though fully and completely set forth herein.

U.S. patent application Ser. No. 09/433,818 titled "A Network Communications Service with an Improved Subscriber Model Using Digital Certificates" and filed on Nov. 3, 1999, whose inventors are Brett B. Stewart and James Thompson, is hereby incorporated by reference in its entirety as though fully and completely set forth herein.

U.S. patent application Ser. No. 09/551,309 titled "System and Method for Managing User Demographic Information Using Digital Certificates" and filed on Apr. 18, 2000, whose inventors are Brett B. Stewart and James Thompson, is hereby incorporated by reference in its entirety as though fully and completely set forth herein.

U.S. patent application Ser. No. 09/767,374 titled "Distributed network communication system which allows multiple wireless service providers to share a common network infrastructure" and filed on Jan. 22, 2001, whose inventors are James Thompson, Kathleen E. McClelland, and Brett B Stewart, is hereby incorporated by reference in its entirety as though fully and completely set forth herein.

U.S. Provisional Patent Application Ser. No. 60/383,827 titled "Roaming" AND filed on May 29, 2002, whose inventors are James D. Keeler and Matthew M. Krenzer, is hereby incorporated by reference in its entirety as though fully and completely set forth herein.

U.S. patent application Ser. No. 10/341,761 titled "Authorization And Authentication Of User Access To A Distributed Network Communication System With Roaming Features" and filed on Jan. 14, 2003, whose inventors are James D. Keeler and Matthew M. Krenzer, is hereby incorporated by reference in its entirety as though fully and completely set forth herein.

FIG. 1—Network Communication System

FIG. 1 shows one embodiment of a distributed network communication system 100. The network system 100 may include one or more access points 120, preferably a plurality of access points 120. At least a subset of the access points 120 are wireless access points (APs) 120 which communicate with a portable computing device (PCD) 110 in a wireless fashion. Each wireless access point (AP) 120 may have a wireless connection or transceiver (e.g., an antenna) and may operate according to various wireless standards, such as wireless Ethernet (IEEE 802.11). One or more of the access points 120 may also be wired access points which communicate with a PCD 110 in a wired fashion.

Each AP 120 may be coupled to a network 130. The network 130 may comprise a wired network, a wireless network or a combination of wired and wireless networks. For example, the network 130 may be a standard "wired" Ethernet network which connects each of the wireless (and wired) access points 120 together. The network 130 may also be a wireless network based on IEEE 802.11. The network 130 may form part of the Internet, or may couple to other networks, e.g., other local or wide area networks, such as the Internet.

The network 130 may also include or be coupled to other types of communications networks, (e.g., other than the Internet) such as the public switched telephone network (PSTN), whereby a user using PCD 110 may send and receive information from/to the PSTN or other communication network through a network provider. The network 130 may also include, or be coupled to, another wide area network 130, such as a proprietary WAN. The network 130 thus may be, or be coupled to, any of various wide area networks (WANs) or local area networks (WANs), including the Internet.

The access points (APs) 120 may be widely distributed in various facilities, such as airports, hotels, mass-transit stations, shopping malls, restaurants and other businesses, such as business offices, law firm offices, retail stores, etc. For example, where the access points 120 are distributed in an airport, one or more access points 120 may be distributed throughout various terminals in the airport, in an airline club, and in coffee shops, restaurants or rental car counters at the respective airport. The access points 120 may thus be primarily designed to service mobile users, wherein it may not be known ahead of time which mobile users will be accessing the network from which locations. Thus the network system 100 is preferably a distributed network system, with access points placed in locations to service mobile users. This differs from a conventional fixed LAN, where it is generally pre-configured as to which pre-determined users will be using which nodes in the fixed LAN on a day-to-day basis, and the relative access levels that these pre-determined users have is also pre-configured.

Each access point 120 may comprise information used to identify or select a network provider for a particular user, as well as related access information to enable the network provider to provide access. When in sufficiently close range to an access point 120, or when the PCD 110 is directly coupled to an access point 120 in a wired fashion, the PCD 110 may access the network utilizing a particular network provider, as discussed further below.

A user operating a portable computing device (PCD) 110 may communicate with one of the access points 120 to gain access to network services, such as Internet access. The portable computing device (PCD) 110 may have a wireless communication device, e.g., a wireless Ethernet card, for communicating with a wireless access point 120. The portable computing device (PCD) 110 may instead have a wired communication device, e.g., an Ethernet card, for communicating with a wired access point 120.

The PCD 110 may be any of various types of devices, including a computer system, such as a portable computer, a personal digital assistant (PDA), an Internet appliance, a communications device, or other wired or wireless device. The PCD may include various wireless or wired communication devices, such as a wireless Ethernet card, paging logic, RF communication logic, a wired Ethernet card, a modem, a DSL device, an ISDN device, an ATM device, a parallel or serial port bus interface, or other type of communication device.

The PCD 110 preferably includes a memory medium which stores identification information indicating a network provider to which the user has subscribed. The indicated network provider may be one of a plurality of possible network providers that provide Internet access or other network services in a network system such as that shown in FIG. 1. The identification information may be a System ID (an 802.11 System ID), a Media Access Control (MAC) ID of a wireless Ethernet device comprised in the PCD 110, the name of the network provider, or other type of information that uniquely identifies one (or more) network providers. The identification information may be contained in a digital certificate, which may be stored in a web browser or in a memory medium of the PCD 110.

Where the access point 120 is a wireless access point 120, the wireless communication may be accomplished in a number of ways. In one embodiment, PCD 110 and wireless AP 120 are both equipped with an appropriate transmitter and receiver compatible in power and frequency range (e.g., 2.4 GHz) to establish a wireless communication link. Wireless communication may also be accomplished through cellular, digital, or infrared communication technologies, among others. To provide user identification and/or ensure security, the PCD 110 may use any of various security mechanisms.

Where the access point 120 is a wired access point 120, the wired connection may be accomplished through a variety of different ports, connectors, and transmission mediums. For example, the PCD 110 may be connected through an Ethernet, USB, serial, or parallel transmission cables, among others. The PCD 110 may also include various communication devices for connecting to the AP 120, such as wired Ethernet cards, modems, DSL adapters, ATM adapters, IDSN devices, or other communication devices. For example, a hotel may have Ethernet connections in the restaurants, shops, and guest rooms. An airline club, e.g., an airport Admiral's Club, may also have both wireless and wired connections for mobile users. A user may connect to a wired access point 120 through the use of a laptop computer (PCD 110), an Ethernet network card, and a network cable. This connection may have the same impact as a connection made to a wireless AP 120 as discussed above. In other words, a user using a wired PCD 110 is able to "roam" on various network infrastructures in the same manner as a user using a wireless PCD 110.

One or more network providers may each have an associated network device 160 coupled to the network 130. For example, FIG. 1 illustrates network devices 160 associated with three different network providers. The network devices 160 may take any of various forms, such as a computer system, router, bridge, etc. It is noted that network providers may provide network services at a location without being required to locate any equipment or bandwidth at a network location. For example, a network provider may combine VLANs and IP tunneling to avoid having to locate any equipment or bandwidth at a particular network location.

A user operating a PCD 110 will typically have previously subscribed with one (or more) network providers. Examples of network providers include Wayport, MobileStar and Softnet, among others. As discussed further below, when the PCD 110 of a user communicates with an AP 120, the respective network provider to which the user is subscribed is determined. If no previous affiliation with a network provider is detected, a default network provider may be selected. After the network provider is determined or selected, network access or services may be provided through that network provider. For example, data or packets from the respective PCD 110 may be routed to a destination designated by the respective network provider, such as the respective provider's network device 160. This effectively allows a plurality of network providers to each offer access on a common network infrastructure. This also allows subscribers of various network providers to "roam" on other networks, such as networks installed and/or maintained by other providers, or networks maintained by independent third parties.

The network system 100 may also include a management information base (MIB) 150. The MIB 150 may be a mechanism, such as a memory, which may allow the persistent storage and management of information needed by network 130 to operate. For example, in one embodiment of the invention, the MIB 150 may store a data structure, such as a table comprising a list of identification information and a corresponding list of the plurality of possible network providers. The data structure may also store access information, which may comprise associated methods for providing data to the respective plurality of possible network providers. The access information may further comprise access level or privilege level information. Thus, the data structure may comprise a table having a plurality of tuples, with each tuple having the identification information, e.g., a System ID, the corresponding network provider, and access information containing a method of access to the provider, possibly including a destination IP address or other methodology for accessing the provider's site. In an alternate embodiment, as noted above, the data structures which store this information may be comprised in each of the access points 120, or may be provided in various other locations.

As discussed further below, when a portable communication device 110 of a user begins communication with an access point 120, the network provider for the PCD 110 may be determined using this data structure. The memory medium containing the data structure may be accessed, and received network provider identification information from the respective PCD 110 may be used to index into the data structure or table to determine the network provider. The appropriate access method may also be accessed and used for enabling the network provider to provide network services, e.g., the access method may be used for providing the data from the respective PCD 110 to the determined network provider. Access level information may also be retrieved and used to determine a user's access to local network resources or Internet access.

The MIB 150 may store other information, such as a directory of all the elements (e.g., APs, PCDs, etc) in the network, the topology of the network, characteristics of individual network elements, characteristics of connection links, performance and trend statistics, and any information which is of interest in the operation of the network 130. For example, the MIB may store the precise longitude, latitude, altitude and other geographic information pinpointing the location of each access point.

One or more service providers 140 may also be coupled to the network 130 or other networks to which the network 130 is coupled, such as the Internet 170. As used herein, the term "service provider" is intended to include various types of service and information providers which may be connected to the network 130. The service provider 140 may take any of various forms and may provide any of various services or information. Each service provider 140 may include one or more computers or computer systems configured to provide goods, information, and/or services as appropriate for the service provider. The one or more service providers 140 may couple to the network in a wired or wireless fashion.

The network communication system 100 may be geographic-based. In other words, the network communication system 100 may provide information and/or services to the user based at least partly on the known geographic location of the user, e.g., as indicated by the access points 120 or as indicated by geographic information (e.g., GPS information) provided from the PCD 110. In one embodiment, the APs 120 are arranged at known geographic locations and may provide geographic location information regarding the geographic location of the user or the PCD 110. In another embodiment, the PCD 110 may provide geographic location information of the PCD 110 through the AP 120 to the network 130. For example, the PCD 110 may include GPS (Global Positioning System) equipment to enable the PCD 110 to provide its geographic location through the AP 120 to the network 130, such as to a service provider 140 coupled to the network 130.

Memory Medium and Carrier Medium

One or more of the systems described above, such as PCD 110, access points 120, MIB 150, and network providers 160 may include a memory medium on which computer programs or data according to the present invention may be stored. For example, each of the access points 120 and/or the MIB 150 may store a data structure as described above comprising information regarding identification information, corresponding network providers 160 and access information such as associated data routing methods. Each of the access points 120 and/or the MIB 150 may further store a software program for accessing these data structures and using the information therein to properly provide or route data between users (subscribers) and their corresponding network providers, or to selectively provide or route data depending on the access information.

The term "memory medium" is intended to include various types of memory or storage, including an installation medium, e.g., a CD-ROM, or floppy disks 104, a random access memory or computer system memory such as DRAM, SRAM, EDO RAM, Rambus RAM, NVRAM, EPROM, EEPROM, flash memory etc., or a non-volatile memory such as a magnetic media, e.g., a hard drive, or optical storage. The memory medium may comprise other types of memory as well, or combinations thereof. In addition, the memory medium may be located in a first computer in which the programs are executed, or may be located in a second different computer which connects to the first computer over a network. In the latter instance, the second computer provides the program instructions to the first computer for execution. The memory medium may also be a distributed memory medium, e.g., for security reasons, where a portion of the data is stored on one memory medium and the remaining portion of the data may be stored on a different memory medium. Also, the memory medium may be one of the networks to which the current network is coupled, e.g., a SAN (Storage Area Network).

Also, each of the systems described above may take various forms, including a personal computer system, mainframe computer system, workstation, network appliance, Internet appliance, personal digital assistant (PDA), television system or other device. In general, the term "computer system" can be broadly defined to encompass any device having a processor which executes instructions from a memory medium.

The memory medium in one or more of the above systems thus may store a software program or data for performing or enabling roaming or selective network resource access within a network system 100. A CPU or processing unit in one or more of the above systems executing code and data from a memory medium comprises a means for executing the software program according to the methods or flowcharts described below.

Various embodiments further include receiving or storing instructions and/or data implemented in accordance with the present description upon a carrier medium. Suitable carrier media include memory media as described above, as well as signals such as electrical, electromagnetic, or other forms of analog or digital signals, conveyed via a communication medium such as networks and/or a wireless link.

FIG. 2

Figure 2:
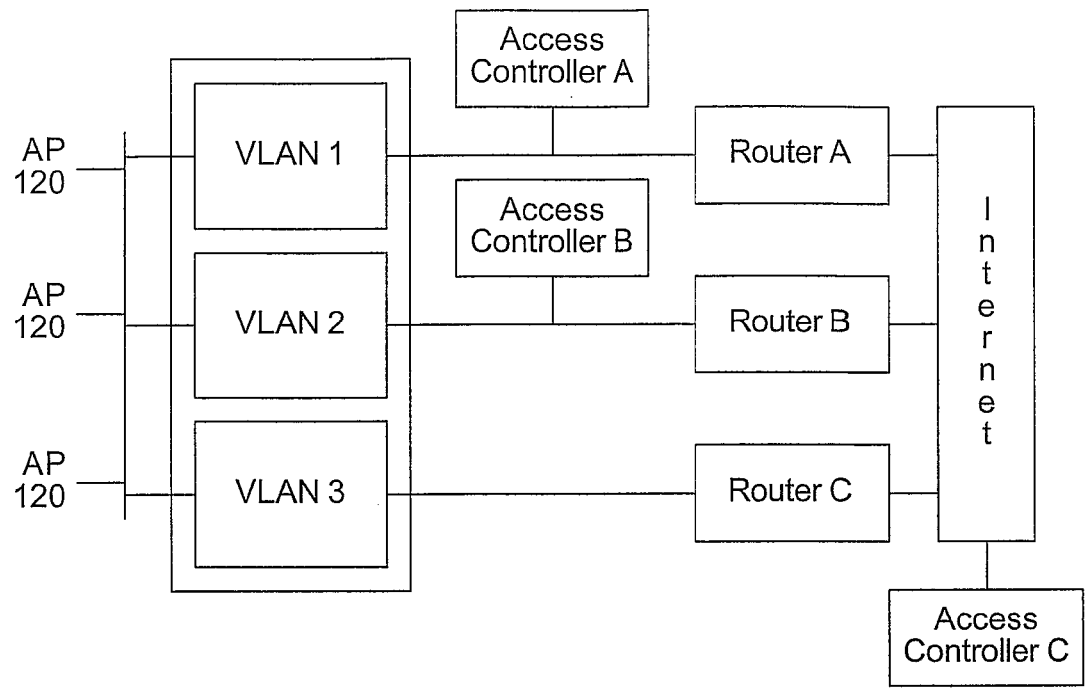
FIG. 2 is a more detailed block diagram of one embodiment of the wireless network system of FIG. 1 according to one embodiment.

FIG. 2 is a more detailed block diagram illustrating a portion of the wireless network system of FIG. 1. FIG. 2 illustrates an embodiment having three access points 120 which each couple through a respective VLAN, labeled VLAN1, VLAN2 and VLAN3. Each of VLAN1, VLAN2 and VLAN3 in turn couple to respective routers 160, labeled router A, router B and router C, which are provided by the respective network providers A, B and C respectively. These routers in turn couple to the Internet. As shown, one or more access controllers, e.g., computer systems configured to determine or control network service access, may be provided for each of the network providers. The access controllers operate to verify user or subscriber access to the respective provider's network. FIG. 2 illustrates access controller A, access controller B and access controller C. As shown, access controllers A and B are coupled to router A and router B respectively. However, the access controller may be located outside of the local network 130, e.g., may be comprised on any of various locations on the Internet, as shown with respect to access controller C.

In this embodiment, the data structure may store an identification information/VLAN tag mapping, e.g., an SID/VLAN tag mapping, which operates to map the user to the appropriate VLAN of the user's network provider.

Figure 3:
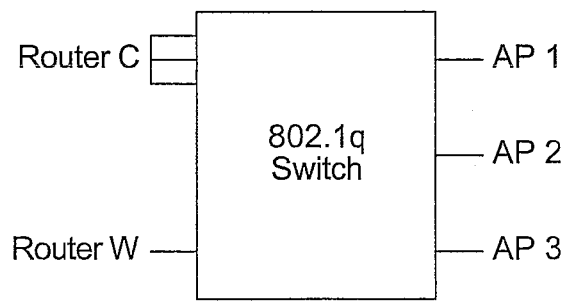
FIG. 3 is a block diagram of another embodiment of the wireless network system of FIG. 1 according to one embodiment.

As shown, each of VLAN1, VLAN2 and VLAN3 may be supported in one or more Ethernet switches which support tagged VLANs (IEEE 802.1q). In addition, the switch may also support IEEE 802.1p, which provides various quality of service (QoS) metrics. This enables the switches to enforce certain predefined quality of service metrics to any given port or virtual port contained within the network. As shown in FIG. 3, it is also noted that a router may be present on more than one VLAN. As shown, FIG. 3 includes an 802.1q switch which couples to three access points referred to as access point 1 (AP1), access point 2 (AP2), and access point 3 (AP3). As shown, a router labeled router C may be coupled to two or more VLANs as shown.

Using VLANs, each access point 120 preferably has the ability to transmit/receive on one or more VLAN IPs to one or more service providers. This permits, but does not require, that each network provider use its own network numbering plan. At most, each network provider may have an access controller and a router at each coverage location. As shown in FIG. 3, the access controller is not required to be physically located at the coverage location, but rather may be located anywhere.

Figure 4:
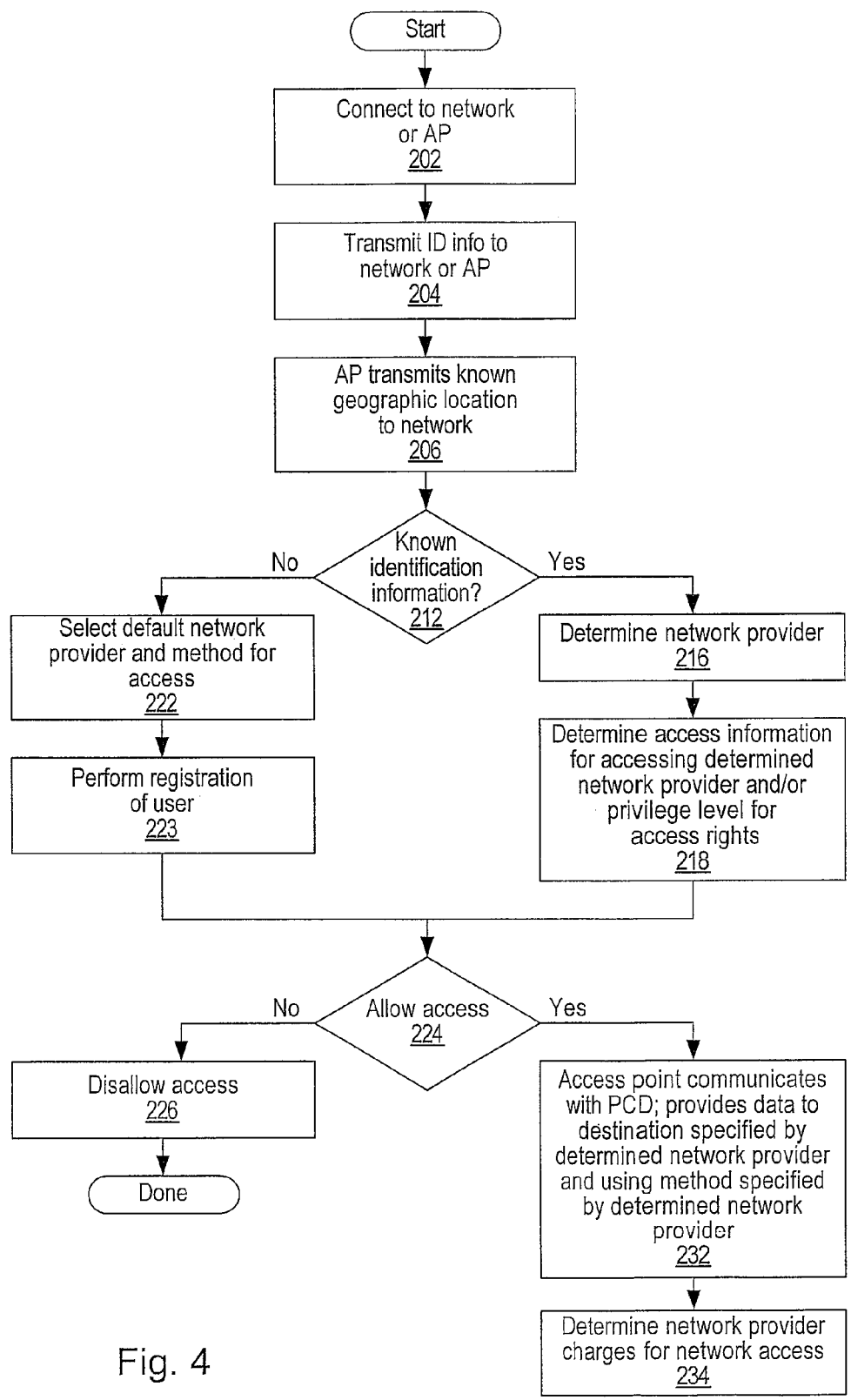
FIG. 4 is a flowchart diagram illustrating operation of allowing access to a wireless network system using a roaming model according to one embodiment.

FIG. 4—Network Access Using Roaming

FIG. 4 is a flowchart diagram illustrating operation of allowing roaming access and/or selective access to a wireless network system. In one embodiment, as described above, the PCD 110 includes identification information, preferably comprising a System ID, stored in the memory of the PCD 110. The identification information may store information which identifies one (or more) network providers to which the user of PCD 110 is a subscriber.

The network access method of the present invention may be operable to receive and use the identification information to facilitate roaming, e.g., to allow a particular network provider to be selected and used for a user operating on the network. As discussed further below, the identification information may also store access level information which may be used to indicate a network access or privilege level. This stored access level information may be used to selectively allow user access to different parts of the network.

As shown, in step 202 the user connects to the network (e.g., to an access point of the network). For example, the user may be walking in an airport with a PCD and may connect in a wireless fashion to an access point located at the airport. In another scenario, the user may enter a hotel room and connect in a wired or wireless fashion to an Ethernet port in his/her room which is connected to the network. In another scenario, the user may enter an office of a business, such as a law firm or corporation, and may connect in a wireless or wired fashion to an access point located in that office. Thus, the user may connect to the network or an access point of the network in any of various locations in a wireless or wired fashion.

In step 204 the personal computing device (PCD) 110 of the user transmits identification information (ID information) to an access point (AP) 120 of the network. The identification information may take any of various forms. In one embodiment, the identification information comprises a System ID (SID) according to IEEE 802.11. As discussed above, IEEE 802.11 (wireless Ethernet) is designed to support multiple overlapping wireless LANs in a given coverage area. IEEE 802.11 uses the System ID (SID) to "select" which LAN to use, and thus which access point with which to associate. In this embodiment each System ID may be uniquely associated with a respective network provider, and thus the user may configure the System ID on his/her PCD 110 to uniquely identify the network provider to which the user has selected or subscribed.

The identification information may also or instead be a MAC ID which is comprised on a wireless Ethernet card of the personal computing device used by the user. The MAC ID may perform a similar purpose in selecting the network provider. As noted above, the identification information may take various forms. For example, the identification information may simply comprise the name of the respective provider and the appropriate access information, which may be contained in a digital certificate. The identification information may comprise other types of network provider identification as desired.

In prior art systems, access points are only able to "listen for" one System ID which corresponds to one network provider. According to one embodiment of the invention, each access point 120 is operable to "listen for" or "detect" a plurality of different sets of identification information, e.g., a plurality of different System IDs, which may correspond to a plurality of different possible network providers, or which may correspond to unknown network providers. Thus, each AP may be set up to "listen" for all types of identification information, e.g., listen for all SIDs, and to answer all queries from PCDs 110, even if the identification information or SID is not recognized by the particular AP 120. Alternatively, each of the access points may be operable to broadcast requests for identification information. For example, each of the access points may periodically broadcast requests for SIDs. Alternatively, each of the access points may periodically broadcast recognized System IDs to the PCDs, i.e., broadcast the sets of SIDs the access point supports, wherein the PCDs may respond to this broadcast by providing the identification information.

In step 206 the access point 120 to which the user has connected may transmit known geographic location information to the network (e.g., to a network provider on the network). This known geographic location information may originate from the AP 120 or from the PCD 110 of the user. As discussed further below, this known geographic location information may be used in various ways. For example, the geographic location information may be used in selecting among two or more possible network providers to which the user has previously subscribed, or may be used in selecting the default provider.

The geographic location information may also be used in determining the network services or access privileges of the user, or used in determining charging aspects of the use. For example, this known geographic location information may be used to determine whether a third party pays for the network access of the user. As one example, an employer of the user (employee) may have previously directed that the employer will pay for network access of the employee if the employee is located in an airport or hotel, but not if the employee is located, for example, in a bar. The known geographic location may also be used to determine a charge rate, based on various incentive or sponsorship programs of which the user is a member. For example, the user may receive a discount if he/she uses network access from certain locations, such as a certain business, a certain airport club, etc. The known geographic location information may also be used to selectively provide different access or privilege levels based on the geographic location, e.g., a user may have greater privilege/access levels at a first geographic location than from a second different geographic location. This known geographic location information may further be used to provide services to the user which are dependent upon the geographic location of the user. For more information on the use of geographic location information for providing geographic based services, please see U.S. Pat. No. 5,835,061, referenced above.

In step 212 the network provider may examine the received identification information, e.g., the System ID, or other identification information and determine whether the received identification information is known or recognized. In step 212 the method may also determine if other id information is valid. If the identification information is determined to not be known, e.g., the System ID is unknown, then in step 222 the method may perform processing to account for the unknown identification information. Step 222 may also involve performing processing for an unknown or incorrect digital certificate or other unknown information.

In step 222, where the identification information is determined to not be known or recognized, the method may select a default network provider for the user for network access. The default network provider may be the provider who maintains the wireless network system being used, or may be a randomly selected provider. In step 223 the user may be required to register with this provider to gain network access. This provider may then arrange for ad hoc billing of the user, such as by credit card. For example, the provider may present a web page on the user's PCD 110 requesting the user to enter credit card information for access to the network. Operation then proceeds to step 232.

Also, if the identification information is determined to not be known, the access or privilege level of the user may be set to the lowest possible level. This, for example, may allow the user to only have access to certain limited local resources, but no external access, e.g., to the Internet. Thus, for example, where the APs 120 are located in an airport, the user having a low access level, e.g., the user whose identification information is not known, may be granted access to certain local resources, such as coffee shops, bookstores, and advertising on the local LAN at the airport, but may not be provided with Internet access. Access to local resources may be allowed since this does not require the use of external facilities and hence does not consume off-property bandwidth, and thus is relatively inexpensive to provide. Alternatively, if the identification information of a user is determined to not be known, the system may provide some form of external access, which may be billed separately by an external Internet provider, without the user being able to view or use any local network resources.

If known identification information is determined to be received in step 212, then in step 216 the method may determine the network provider which corresponds to the identification information (e.g., the System ID). In the preferred embodiment, a data structure comprising network provider information is stored in each of the access points 120. In this embodiment, the respective access point with which the user is communicating receives the identification information and uses the identification information to obtain the appropriate or corresponding network provider to which the user of the PCD 110 is subscribed. In step 218 the respective access point 120 may also access the data structure to determine the appropriate access method or access level for providing data or packets to the respective network provider. The respective access point 120 may instead access this information from a separate data structure stored in MIB 150.

In an alternate embodiment, the PCD 110 of the user may provide all of this information to the access point 120. In this embodiment, the data structure containing the network provider data and access information may not be required to be stored in the access points 120 or on the network. Alternatively, data may be stored on the network 130, e.g., in the access points 120 or in the MIB 150, which is used only to validate this information received from the user.

As discussed above, the data structure is preferably a table comprising a plurality of three-tuples wherein each tuple stores a set of identification information, the corresponding network provider associated with that identification information, and access information associated with that network provider and/or the user. An example of this data structure is shown in FIG. 5. The data structure shown in FIG. 5 includes five different sets of three-tuples. It is noted that the data structure may take any of various forms.

The access information may include an access method, possibly including a destination address or other method by which data packets are routed to/from the respective site of the network provider or other method which directs that network access be provided by that network provider. The access information may also include an access level or privilege level that indicates which network resources that the user may access, e.g., whether the user is only allowed access to resources on the local network 130, or is only or in addition allowed external access, such as Internet access.

Thus, when the access point 120 receives the identification information, the access point may simply use the identification information to index into a table containing this information to determine the appropriate network provider and the respective access method and/or access level.

It is noted that each of steps 212, 216 and 218, and 222 may be performed as one action or a series of related actions. In other words, when the access point 120 receives the identification information, if the identification information does not index into any of the entries in the data structure or table, then the identification information or System ID is determined to be unknown or not associated with a respective network provider as determined in step 212. In this case, the default provider and default access level may be selected as performed in step 222. If the identification information does index properly into an entry of the table, but the corresponding network provider does not have the necessary equipment to accommodate the user, then this may also be treated as unknown identification information, where another provider or the default provider may be selected as performed in step 222.

If the identification information properly indexes into the table, then in steps 216 and 218 information from the respective entry of the table is accessed and used to determine a corresponding network provider which can accommodate the user's network access, as well as the associated method and access level for providing network access using the network provider.

After the network provider and associated access method/level have been determined in each of steps 216 and 218, then in step 232 network access or network services may be provided to the PCD 110 through the determined network provider. For example, in step 232 the access point 120 to which the user is communicating may operate to provide data to/from a destination specified by the determined network provider using the method specified by the determined network provider, e.g., the method comprised in the table or data structure. In one embodiment, the access point 120 may operate simply as a bridge or router which operates to forward or route packets to the appropriate destination, e.g., to the network provider's network device 160 or to the provider's site. As noted above, the network provider may provide a network device 160 such as a router, which operates to route packets to the provider's site or otherwise simply allow Internet access to the PCD. Thus in step 232 the method allows the PCD of the user access to the network using the user's provider.

In another embodiment, the access point 120 itself operates as a router to route packets to the determined network provider's site, which may be located on the Internet. Thus, in this embodiment, the network provider may not be required to provide any type of network device 160 to enable network access for its respective subscribers. Rather, data packets from the PCD 110 of the user may be routed to the network provider's site on the internet, which may be located in any location.

In step 232 data is communicated between the PCD 110 and the respective destination specified by the network provider preferably using a secured technique. Examples of possible secured techniques include Layer 2 forwarding; various tunneling protocols such as PPTP, IPSEC, GRE, and IP-in-IP; and tagged VLANs (IEEE 802.1q), among others.

In one embodiment, in step 232 the access point 120 operates to direct PCDs 110 to an available communication channel, e.g., an available RF channel or other wireless channel, possibly based on information received from the PCD 110. Thus the access point 120, not the PCD 110, may assign channels for communication. For example, the an access point 120 may operate to direct a PCD 110 to an available communication channel (e.g., an RF channel) based on the identification information, e.g., the SID, received from the PCD 110. The access point 120 may also operate to direct the PCD 110 to an available communication channel based on other types of identification or authentication information, or on the determined access level of the PCD. This allows an access point 120 to separate the communication traffic onto different channels based on the network provider being used, or based on the access or privilege level of the PCD 110. For example, the access point 120 may assign a PCD 110 a communication channel based on whether the PCD 110 has access to private portions of the network.

In step 234 the selected network provider may record charges for the network access. In one embodiment, each of the network provider's respective devices 160 may maintain separate charge/billing information for each of their respective subscribers. Thus, the network device 160 of the selected network provider may record charges for the network access of the user. Alternatively, a computer system coupled to the network 130, such as the MIB 150, or another computer system, may receive information from the wireless access point 120 as to the determined network provider, and the computer system may maintain billing/charging information for each of a subset or all of the network providers. In one embodiment, billing information for the user may be stored on the PCD 110 and may be provided to the AP 120.

As noted above, network charging information may also be based on known geographic information, as well as, for example, sponsorship or demographic information of the user, which may be provided to the access point in a digital certificate.

As noted above, the data structure or table containing network provider information may be stored in each of the access points 120. Alternatively, the data structure may be stored in a separate computer system, such as the MIB 150. In this latter instance, each of the access points 120 may operate to forward the identification information to the MIB or other computer system 150, and this computer system performs steps 212, 216 and 218 of determining the appropriate network provider and corresponding access method, or selecting the default provider. Once the network provider and access method have been determined in this embodiment, this information may be forwarded to the respective access point 120 for proper routing, or the respective access point 120 may forward data received from the PCD 110 of the user to the MIB 150 or an associated router for proper routing to the respective network provider's device 160 or to the appropriate site on the Internet.

Thus, in step 232 the PCD 110 of the user is allowed to obtain network access through his previously chosen network provider, i.e., through the network provider to which the user has previously subscribed. As noted above, the network provider, may operate to maintain billing/charging information through its equipment 160, at its site, or through a shared resource such as MIB 150. As also noted above, the billing information may be stored on the PCD 110 of the user, e.g., in the user's digital certificate. In this case, if the AP 120 answers the query of the PCD 110 and allows access after confirming the identification information, the system allow for roaming and billing. This effectively allows users to roam on various network infrastructures, e.g., allows a user who is a subscriber of network provider A to roam on a network infrastructure operated and maintained by network provider B. Alternatively, certain portions of the network infrastructure may be built and maintained by a third party who is not a network provider, and subscribers of each of the various network providers may be able to roam onto this network, perhaps with a small fee being paid to the manager of the network infrastructure in addition to the fee normally paid to the network provider for network access. Further, users who have never previously subscribed to a network provider may be allowed to communicate with an AP 120 and select a network provider, or be assigned the default network provider, for access.

Different Access Levels

As noted above, in one embodiment, the data structure or table may store one or more different access methods depending upon an access level received within the identification information. Thus, referring back to FIG. 1, the network 130 may provide certain local network resources as well as external Internet access which may be both available to users having a first access level. Users with a second lower access level may not be entitled to external access, but may be simply able to view or utilize certain local network resources on network 130. Users may also be selectively allowed to make 802.11 voice calls using the network, depending on access level.

For example, in an airport scenario, a non-recognized user, or a user paying a lower fee, may have an access/privilege level that only allows him/her local content such as various airport advertising, airport information such as the layout of the airport, including where the restroom, restaurants, etc. are located, flight information, etc., but does not allow the non-recognized user external access, e.g., access to the Internet. A non-recognized user would of course also not have any access to private corporate LAN's maintained on this network, such as the corporate LANs of airlines located at the airport.

If the wireless network system provides a mechanism for the user to register or subscribe to a network provider, then the user may do so and receive Internet access through that selected provider. As another alternative, the network system may provide a mechanism for the user to register or subscribe to an external network provider, e.g., and external ISP, perhaps with a small referral fee paid to the maintainer of the network system.

Alternatively, the network 130 may provide various local resources as well as external Internet access which are both available to users having a first access level, and users with a second access level may not be entitled to view or utilize these local network resources on network 130, but may be simply provided some form of external access, such as external telephone access using VoIP or possibly a pathway to the Internet.

For example, where the network 130 and one or more wireless access points 120 are comprised in an airport, one or more airlines may maintain various computing resources on the local network 130 which are usable solely by airline employees and personnel. In this embodiment, PCDs 110 of airline employees may comprise identification information which indicates an access level that allows them access to the various computing resources on the network 130. Thus, employees of a first airline such as American Airlines may have first access level information stored on their PCD 110 that entitles them to utilize certain American Airline computing resources on the network 130, whereas employees of Delta Airlines may have second different access level information stored on their PCD 110 which enables use of only Delta Airlines computing resources located on the network 130, etc. For each user who is not an airline employee or personnel, the user may have access information stored on his or her PCD 110 which only allows him or her external access toward the Internet and use of certain non-private local resources, but does not allow him or her to view or use any of the private computing resources on the network 130. Thus, PCDs 110 of the user may store various access level information comprised within the identification information which selectively allows access to certain resources on the local network 130. This effectively allows private and public portions of the network 130.

As another example, consider an office, such as a law firm office or business which maintains one or more wireless or wired access points 120. Employees of the office may have first access level information (possibly of varying degrees) stored on their PCD 110 which enables them access to selected resources or all resources on this network 130. However, visitors to this office which do not have this privilege or access level may be detected by a wireless or wired access point and not be allowed to view or use any of the resources on the local network 130, but rather may simply be provided a port for complementary (or billable) external access to the Internet. Thus, a visitor or customer of the business who is physically present in the office and desires Internet access may utilize his or her PCD 110 to gain access to the Internet through the local network of the office 130, without the visitor or customer being able to view any of the computing resources, file servers, etc. of that local network 130. In addition, if the user's corporate intranet is web-based, the user may be allowed access to his or her own LAN computing resources remotely. This allows businesses to provide customers and visitors with Internet access through its network 130 without compromising the security of the network 130.

As noted above, in one embodiment, the known geographic location information may also be used to selectively provide different access or privilege levels based on the geographic location, e.g., a user may have greater privilege/access levels at a first geographic location than from a second different geographic location. For example, where the network 130 and one or more wireless access points 120 are comprised in an airport, a user may have a greater access level and hence access to more network resources from, for example, an airline club such as an Admiral's Club, and the same user may have a lesser access level and hence access to fewer network resources from an airline gate. Thus, the access level of a user may be based at least partly on the geographic location of the user. This may possibly based on various agreements negotiated by service providers to "reward" users who are present at their geographic location, in a similar manner to which the network charge rate may also be based on the geographic location of the user.

Thus, in step 218, where the method determines an access method for the network provider, the method may also determine one or more access levels or privilege levels contained within the identification information to determine whether the should be provided with Internet access or should only have access to local resources on the network. The method may also determine the known geographic location of the user to aid in determining the access level as described above.

In step 232 the access point 120 or MIB 150 or other device operates to provide or route data depending upon this access level. Thus, users with the appropriate access level may have Internet access as well as be able to view and use resources on the network 130, while users lacking this necessary access level may simply be provided with certain local network resources and not have any Internet access. Alternatively, users having a lower access or privilege level may be provided some form of external access, such as local telephone access using VoIP, 802.11 voice calls, or possibly complementary Internet access, without being able to view or use certain private network resources.

FIG. 6 illustrates one exemplary embodiment, where a PCD 110A of a first user comprises identification information having an access level which indicates that the user has access only to the computing resources on the local network 130. In this instance, once this access level has been verified as determined by a lookup in the table or data structure, data or packets from the PCD 110A may be routed to various computing resources on the local network as shown by the arrows designated "1". In contrast, PCD 110B of a second user comprises identification information which includes a greater access level which encompasses accessing local resources on network 130 as well as Internet access. In this instance, in addition to local network access, data or packets may also be routed from the PCD 110B through the access point 120 and directly out to an external access port for Internet access.

Thus, the user who does not have the appropriate access or privilege level is able to view or use any computing resources on the network 130, but cannot gain Internet access through the network 130. As noted above, the system can also be configured whereby the user who does not have the appropriate access or privilege level is only allowed Internet access, and users with higher privilege levels are able to view or use computing resources on the network 130.

Thus, the present invention enables a plurality of network providers to utilize a common set of wireless or wired access points to provide their respective services to a potentially overlapping set of customers. This allows use of a single network infrastructure, which minimally impacts the wireless spectrum available at a location while allowing the maximum possible number of network providers to offer their network access services. In addition, the system and method described herein allows subscribers of a network provider A to be able to use the network access service provided by network provider B in a location otherwise not serviced by provider A without necessarily providing any relationship with provider B and vice versa. This allows a confederation of network providers to offer network access to a larger footprint of locations, which offers more value to each of their respective subscribers.

The system may thus allow network access from multiple different providers. For example, one communication service may be referred to as a Wayport network (Wayport is a Registered Trademark of Wayport, Inc. of Austin, Tex.). A Wayport network may be compatible with other types of similar networks maintained by other companies. For example, if Wayport networks are installed in the Austin-Bergstrom International Airport and similar 'XYZ' networks are installed in a hotel in downtown Austin, a user that has subscribed to Wayport networks may be able to use the services offered at the downtown hotel by XYZ. More specifically, a user that has registered with a Wayport network (e.g., has entered demographic data and agreed to pay transaction costs) may not need to register with XYZ. The user may use other network providers (e.g., XYZ networks) and still only be billed from one company (e.g., the provider of the Wayport network with which the user is registered). This may be accomplished through agreements established between different network providers.

For example, a Wayport network-registered user attempts to connect to a XYZ network in the downtown hotel. In the embodiment described herein, the access point 120 maintained by the XYZ network still answers or communicates with the PCD 110, even though the PCD 110 provides identification information that is different from, and possibly not even recognized by, the access point 120. In this example, assume the XYZ network notices from the PCD ID information that the user is not registered on the XYZ network, but is registered on the WAYPORT network. The XYZ network may perform a verification of the PCD ID by querying a database of registered PCD IDs on the WAYPORT network. The XYZ network may acquire demographic information on the credentials of the user. If the credentials of a user are not acceptable, access to the XYZ network may be denied. If the credentials are acceptable, the XYZ network may grant the user access to various goods, information and/or service providers. The XYZ network may inform the user (via a message on the user's PCD) that there is an additional cost for accessing the XYZ network as a non-registered user. The user may then have the choice of paying the additional fees for the services or disconnecting. In addition, the user may have the option of registering with the XYZ network to avoid paying 'roaming' fees.

Wireless AP Usage of Multiple Channels

A wireless access point 120 can use one of a plurality of different RF (radio frequency) channels for communication with portable computing devices of users. For example, a wireless access point 120 can use one of RF channels 1 through 11. As is well known, RF channels 1, 6 and 11 are non-overlapping, with the remainder of these channels being partially overlapping with other channels.

According to one embodiment of the present invention, each wireless access point can communicate on one or more, e.g. a plurality of or all of, the available wireless channels, e.g., the available RF channels. Furthermore, each access point 120 can control which channel the PCD 110 of a client is able to use. In one embodiment, each PCD may scan each of the RF channels until it detects a wireless access point 120 at one of the channels.

In one embodiment, one or more of the wireless access points may each utilize a plurality of the RF channels, e.g., may use each of the non-overlapping channels 1, 6 and 11 to effectively provide up to three times the channel capacity. Thus, the wireless access point 120 may be able to control allocations of a plurality or all of the respective RF channels to selectively obtain higher bandwidth when appropriate, or to simply accommodate a greater number of subscribers. Thus, if a wireless access point using only one RF channel could only handle fifty PCD's 110 on that respective channel, the wireless access point may operate to use all three non-overlapping RF channels to effectively triple this capacity to a total of 150 simultaneous PCD's 110.

As another example, if the wireless access point 120 is only communicating with one PCD 110, then the wireless access point 120 may optionally or selectively use each of the three non-overlapping RF channels to produce effectively three times the bandwidth for this communication. As additional portable computer devices come into communication with the respective wireless access point, 120, the wireless access point 120 may selectively allocate different channels to different ones of these PCD's as needed. Further, if more than three PCD's are communicating with the respective wireless access point, the wireless access point 120 may partition one or more of the respective channels for the respective users, such as using wireless Ethernet Collision Sense Multiple Access/Collision Detection (CSMA/CD) or other multiple access schemes such as TDMA, FDMA, or CDMA, among others.

In one embodiment, as described above with respect to step 232, the access point 120 operates to direct PCDs 110 to an available channel, possibly based on information received from the PCD 110. Thus, the access point 120, not the PCD 110, may assign channels for communication. For example, the access point 120 may operate to direct a PCD 110 to an available communication channel (e.g., an RF channel) based on the identification information, e.g., the SID, received from the PCD 110. The access point 120 may also operate to direct the PCD 110 to an available communication channel based on other types of identification or authentication information, or on the determined access level of the PCD. This allows an access point 120 to separate the communication traffic onto different channels based on the network provider being used, or based on the access or privilege level of the PCD 110. For example, the access point 120 may assign a PCD 110 a communication channel based on whether the PCD 110 has access to private portions of the network.

FIGS. 7 through 10—Network Access using a Roaming Partner and Network Provider

In one embodiment, a user may access internet services via a network provider 162 with whom the user has no prior relationship. As discussed above with reference to step 232 of FIG. 4, the PCD 110 of the user is allowed to obtain network access through his previously chosen network provider, i.e., through the network provider to which the user has previously subscribed. Users may be permitted to roam on various network infrastructures from multiple network providers. In other words, a user who is a subscriber of network provider A (the roaming partner 170) may roam on a network infrastructure operated and maintained by network provider B (the network provider 162). Alternatively, certain portions of the network infrastructure may be built and maintained by a third party who is not a network provider, and subscribers of each of the various network providers (roaming partners 170) may be able to roam onto this network.

Figure 7:
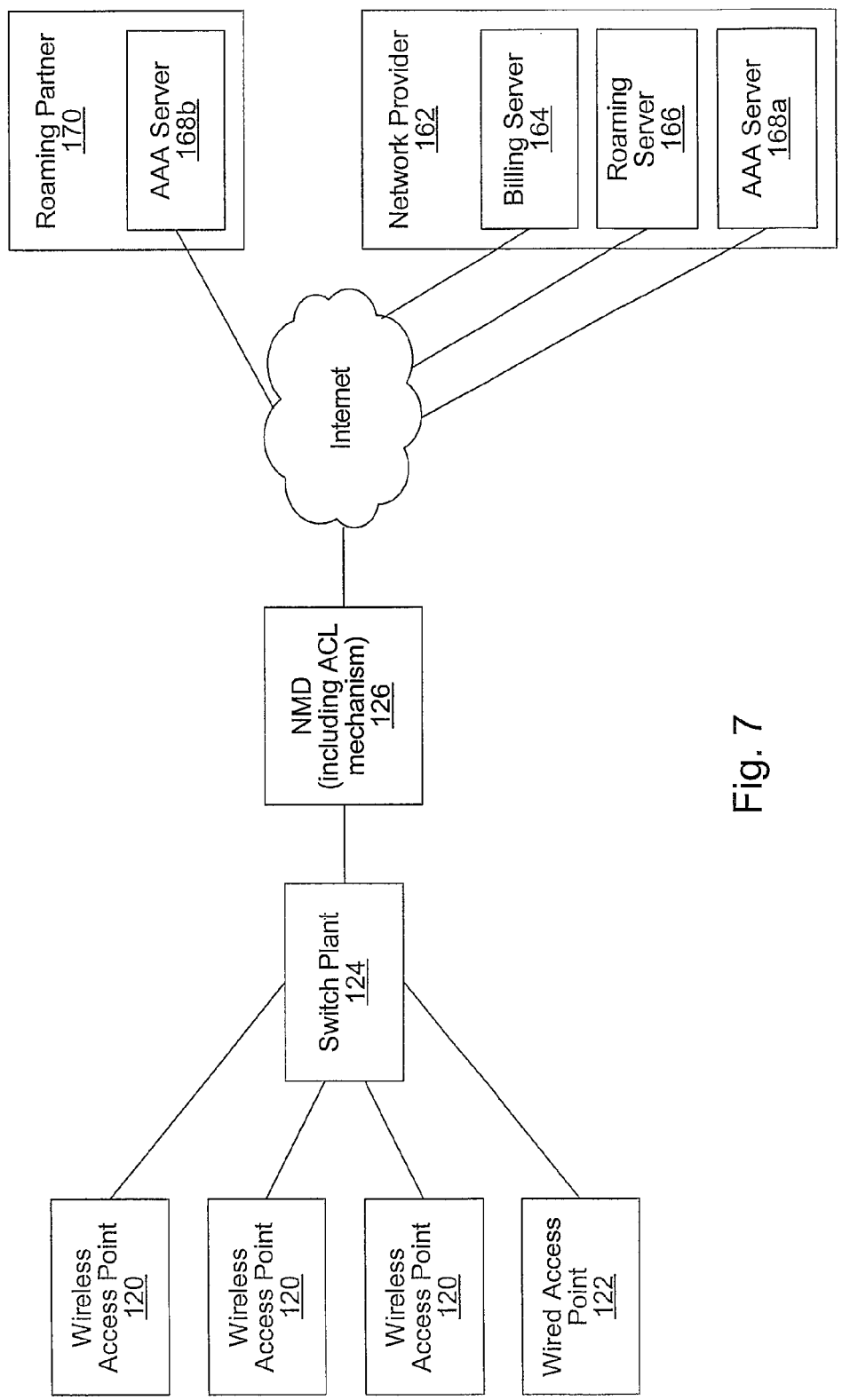
FIG. 7 is a block diagram of a network system including a roaming provider according to one embodiment.

As illustrated in FIG. 7, the user premises (e.g., a hotel or airport) may be configured with a number of wireless access points 120 and/or wired access points 122. These access points (APs) may be coupled to a switch plant 124. For wireless access, the APs may broadcast a network name (e.g., a Service Set Indentifier or SSID) identifying a wireless network from a network provider. If a wireless access card in a PCD is set to accept an SSID of "Any," then the card may associate the PCD with the AP. If, on the other hand, the wireless access card is set to associate only with fixed SSIDs, then the SSID must be set to the particular SSID for the network provider before proceeding. Depending upon the software of the PCD, this SSID configuration process may be manual or substantially automatic (e.g., allowing the user to select SSIDs from a list).

The switch plant 124 may be coupled to a network management device (NMD) 126 for connecting PCDs to the internet. The NMD 126 may comprise the functionality of a router and/or a web-server that provides access to the internet and monitoring of client usage. The NMD 126 may also comprise an access control list (ACL). The ACL may comprise a firewall and/or other security measures.

As used herein, "AAA" is an abbreviation for authentication, authorization, and accounting. In one embodiment, AAA provides a system to control what computer resources users have access to and to keep track of the activity of users over a network (e.g., in IP-based networking). Authentication is the process of identifying an individual, usually based on a username and password. Authentication is based on the idea that each individual user will have unique information that sets him or her apart from other users. Authorization is the process of granting or denying a user access to network resources. Authorization may commence once the user has been authenticated through a username and password. The amount of information and the amount of services the user has access to depend on the user's authorization level. Accounting is the process of keeping track of a user's activity while accessing the network resources. Network resources may include the amount of time spent in the network, the services accessed while there, and the amount of data transferred during the session. Accounting data may be used for trend analysis, capacity planning, billing, auditing, and cost allocation.

AAA services often require a server that is dedicated to providing the three services. RADIUS (Remote Authentication Dial-In User Service) is an example of an AAA service used by many Internet Service Providers (ISPs). When a user connects to the ISP, the user's username and password may be passed to a RADIUS server. The RADIUS server may then check that the information is correct and authorize access to the ISP's system. The RADIUS specification is maintained by a working group of the IETF (Internet Engineering Task Force), the main standards organization for the Internet.

In one embodiment, the roaming system and method may provide at least two different methods for AAA of roaming users: one method for use with a browser, and one for use with client software. Both methods may use a standard RADIUS login with a RADIUS-qualified username and password.

When a web browser is used instead of client software, the web server responds to a get request (requesting a web page from a valid address) with an HTTP 302 redirect to a custom welcome page. Therefore, the custom welcome page is displayed rather than the requested web page. The custom welcome page may permit the user to choose a connection type for accessing the internet: for example, by purchasing a connection (e.g., using a credit card or hotel account), by using an existing membership with the service provider, by using a coupon to purchase a connection, or by using a roaming connection with a roaming provider (e.g., entering a RADIUS name and password). The custom welcome page may require the user to select a connection type and accept an "Acceptable Use Policy" before proceeding. The user will then be able to access the internet in a normal manner until the end of the relevant billing period. In many cases, the billing period may end at check-in time (for a hotel), until midnight (for other premises), or twenty-four hours from the time of purchase. For a web browser, the roaming user may select a roaming connection on the custom welcome page. The web server may instruct the browser to display a logon window for the user to input his or her RADIUS username and password. The username should be RADUIS-resolvable so that the AAA server 168a from the network provider 162 may properly proxy to the AAA server 168b from the roaming partner 170. For example, the username may be of the form: "COMPANYX/ myusername@CompanyX.com." Upon authentication by the roaming AAA server 168b, a RADIUS "start" record may be generated for accounting purposes. A corresponding "stop" record may be generated upon disconnection.

In addition to the authentication credentials, other information may be exchanged between the network provider and the roaming partner. For example, the network provider may publish service and fee information that is specific to the local site and/or network provider, as well as potentially providing options for different service categories. Similarly, the roaming partner may be able to provide information to the network provider regarding, for example, account information and/or restrictions for the customer. By way of example, the network provider might send service and pricing information to the roaming partner as the following:

TABLE 1

| Service | Bandwidth Limit | Charge Units | Price | Option Code |
|---|---|---|---|---|
| Minute-by-minute access | 128 kbps | minutes | $2.50 for first 5 minutes, $0.20/min after | M1 |
| Premium minute-by-minute | 1.5 Mbps | minutes | $5.00 for first 5 minutes, $0.40/min after | M2 |
| Hourly access | 128 kbps | Hours | $5.00/hr | H1 |
| Byte-based access | 128 kbps | Bytes | $1.00/mbyte | B1 |

Figure 9:
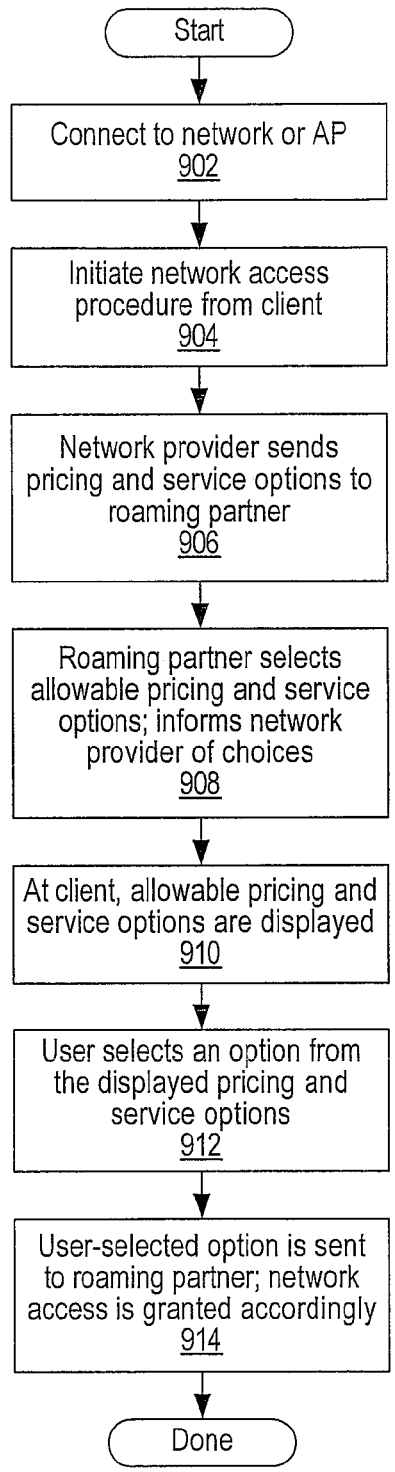
FIG. 9 is a flowchart diagram illustrating a method for providing multiple pricing and service options for roaming access according to one embodiment.
Figure 10A:
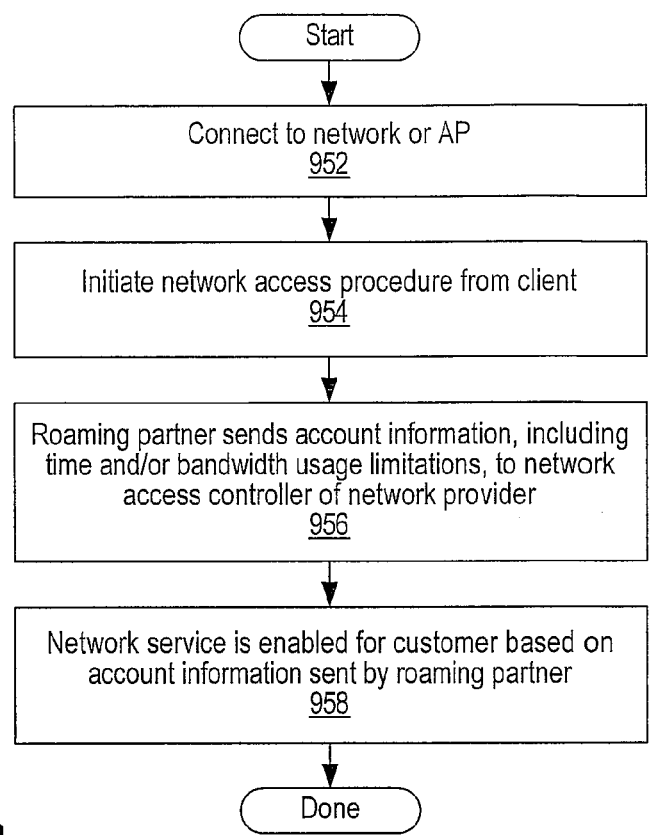
FIG. 10a is a flowchart diagram illustrating a method for providing roaming access using account information received from a roaming partner according to one embodiment.
Figure 10B:
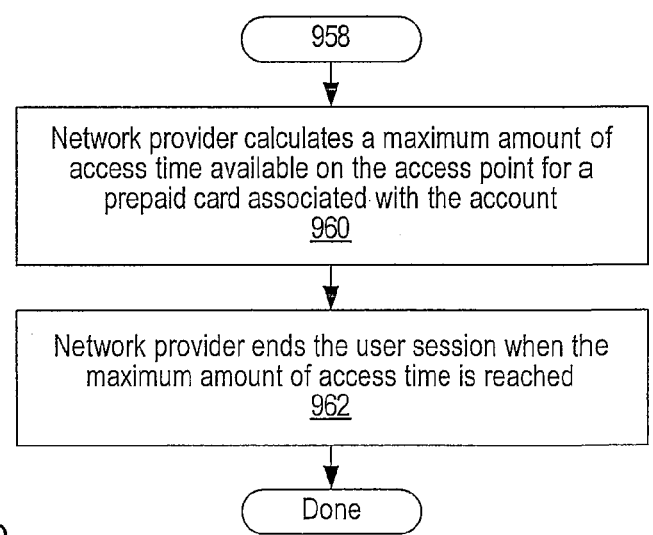
FIG. 10b is a flowchart diagram illustrating a method for providing roaming access using a prepaid card according to one embodiment.

FIGS. 9, 10a, and 10b illustrate these exchanges of information according to various embodiments. In 902, a client may connect to the network, such as through an access point. In 904, a network access procedure may be initiated by the client as described elsewhere herein. In 906, the network provider may send information comprising the available pricing and service options to the roaming partner AAA server. The roaming partner can then transmit back information as to which options are available for the given customer in 908. For example, a particular account may not have premium service available, so the roaming partner would transmit information back to the network provider indicating that option M2 is not available for the current customer. In 910, the allowable pricing and service options (for example, all or some of the options shown in Table 1) may be displayed to the customer by the web browser or client software. In 912, the user may select one of the options. In 914, the network provider may accordingly grant access to the user and inform the roaming partner of the customer's selection.

The roaming partner may also provide other relevant information such as account limits. Again, a client may connect to the network in 952 of FIG. 10a and initiate a network access procedure in 954. In 956, the roaming partner may send account information, including a username/password (or other authentication information) as well as usage limitations (e.g., of time and/or bandwidth), to the network provider (e.g., a network access controller on the network). The network provider should read this information and limit the customer access accordingly in 958. In some circumstances, it is desirable to display information to the customer (such as charge options, added fees, or limitations), and to receive input from the customer (such as option selection, accept or decline fees, etc.). These options can be presented in a webpage displayed on a web browser, or they could be transmitted to a client software application running on the customer's PCD. For example, in the case of a web browser-based interface, after the initial authentication with the roaming partner, the web page could display a message such as:

There will be an initial charge of $2.00 and added fee of $0.20/minute at this site for a maximum bandwidth of 1.5 Mbps. These charges will be added to your <roaming partner name> bill at the end of the month. Click the "Accept charges" button below to accept the charges and proceed. Click the "Cancel" button below to cancel action.

A similar message can be displayed in the user's client software. As another example, in the case of a prepaid card, the display message would have to take into account the amount of funds remaining on the prepaid card. Upon the authentication response, the roaming partner sends the amount of funds remaining on the prepaid card, and the local host access controller calculates the maximum amount of time that can be used with this card. An example display message in this circumstance is:

There will be an initial charge of $2.00 and a fee of $0.20/ minute at this site for a maximum bandwidth of 1.5 Mbps. Your <roaming partner name> prepaid card has $12.00 remaining on it, giving you a maximum of 50 minutes of use at this site. Only the charges for the actual time used plus the initial fee will be deducted from your card. Click the "Accept charges" button below to accept the charges and proceed. Click the "Cancel" button below to cancel action.

If the person accepts the charges, the access controller will have to keep track of the amount of time used and end the session after the maximum amount of time. One form of account limit, for example, may arise in the form of "prepaid cards."

A prepaid card might be purchased for, say, $25.00 and might have only $4.95 remaining on the card. Thus, the roaming partner that issues the card needs to supply information to the network provider stating the account limit. This exchange may be performed during the exchange of account information in FIG. 10a. As illustrated in 960 of FIG. 10b, the network provider may calculate the maximum amount of access time available on the access point for the prepaid card. The network provider may monitor the usage and end the user session in 962 when the maximum amount of usage has been reached.

When the user employs client software rather than a web browser, the custom welcome page is not displayed in one embodiment. Rather, the client software may feed the relevant information (e.g., connection type selected by the user) to a network address (e.g., a Uniform Resource Location or URL) provided by the web server. The user may therefore pass seamlessly to his or her destination with AAA provided by the roaming partner.

In one embodiment, the network provider may offer additional services such as network printing, SMTP mail, and help resources through the custom welcome page and/or client software.

Figure 8:
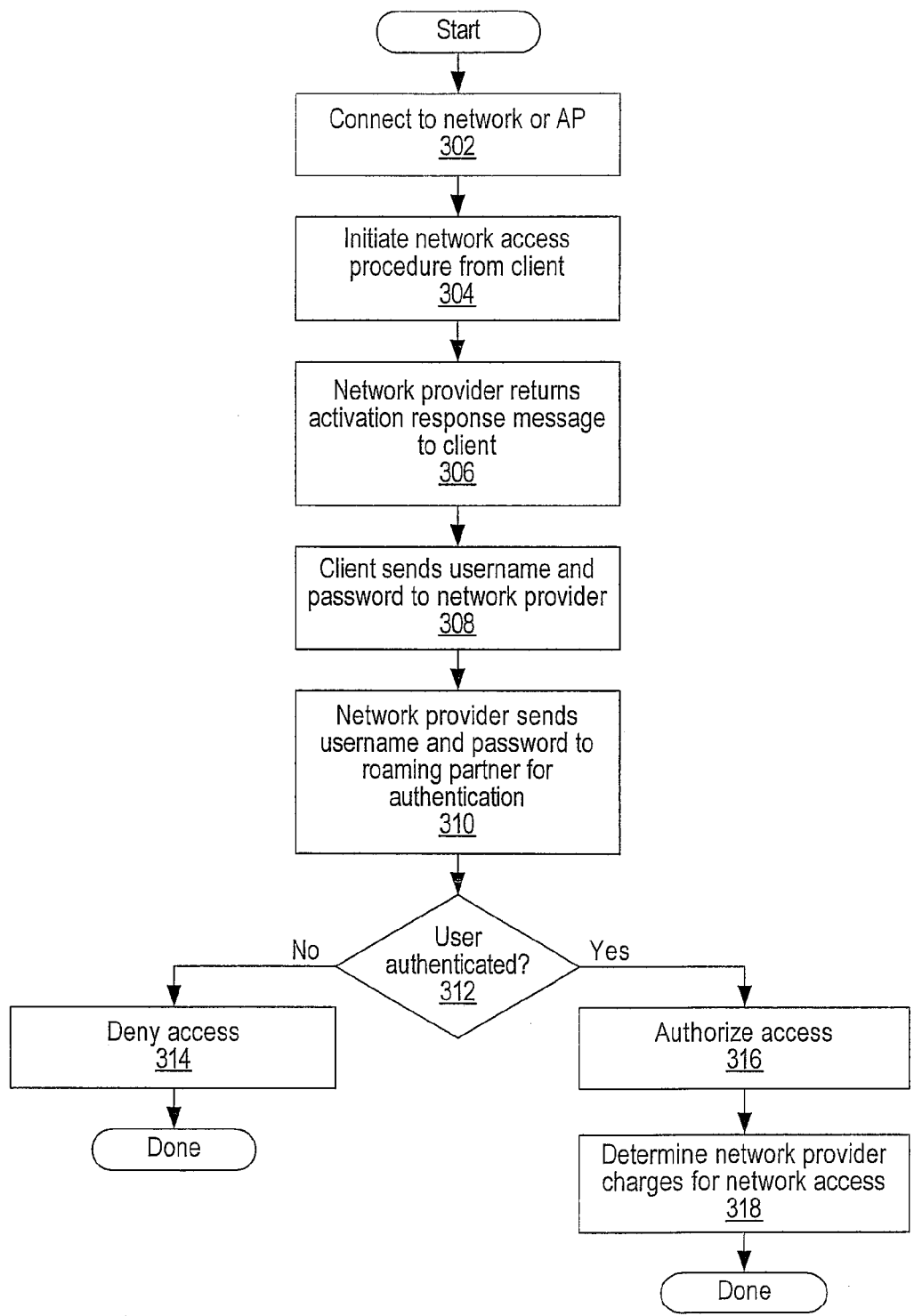
FIG. 8 is a flowchart diagram illustrating a method for providing roaming access using client software according to one embodiment.

FIG. 8 is a flowchart diagram illustrating a method for providing roaming access using client software according to one embodiment. In 302, the client computer (e.g., a PCD linked to an access point) may connect to the network as disclosed herein (e.g., through an access point). The network provider may provide an ACL to screen unwanted traffic and attacks from outside the network. In one embodiment, the outbound ACL to the internet are initially "closed." In 304, a user may use client software on a client computer to send an access request to the network provider who operates the access points and local network. In one embodiment, the client software may perform an HTTP "GET" to a web server, not on the subnet to which the PCD belongs, to initiate the access sequence. In another embodiment, the client software may perform an HTTP "GET" to a web server, on the subnet to which the PCD belongs, to initiate the access sequence. This web server may have the address of the default gateway or default router of the subnet to which the PCD belongs, When the PCD is not currently authorized for access, a network management device (NMD) operated by the network provider may return an activation response message to the client software in 306. The activation response message may include information that is usable to access the internet (e.g., a router address or other network address for the network provider).

The activation response message may be returned to the client software as an HTTP redirect message to the router's "Terms and Conditions" web page. In one embodiment, the redirect message may include the location identifier for the network provider 162 as well as the access procedure identification as described in Table 2. The location identifier and access procedure information may be included within a valid HTML message, such as a message delimited appropriately with the <HTML> and </HTML> tags. The HTML message may include other valid HTML message elements (e.g., HEAD, BODY, etc.).

TABLE 2

| Information name | Type | Field format/value | Required/ optional |
|---|---|---|---|
| Router IP address | HTTP redirect | "{URL}?{query parameters}" | Required |
| Access procedure | HTML Comment | "<!--access procedure=WY.1-->" | Required |
| Location identifier | HTML Comment | "<!--access location={location ID}-->" | Required |
| Error return | HTML Comment | "<!--error={error number}-->" | Required |

In one embodiment, the {location ID} may include characters such as "wp_" (to identify the network provider) concatenated with a 7-bit ASCII numeric code of 1-29 digits. This location ID may uniquely identify the location at which the access will occur. The HTML message may include an error return string as shown in the above table. Error numbers may be defined appropriately (e.g., 0=successful acceptance of request and 255=undefined system error).

In one embodiment, the client software will not perform an HTTP GET operation to the 302 redirect location. Rather, the redirect is provided to pass back the {Query parameters} shown above. To make an authentication/authorization request, the client software may then form a logon URL in the format "https://roamer.{network provider and domain}/roamer_login.adp", where {network provider and domain} indicates an internet address for the network provider (e.g., wayport.net).

In 308, the client software may then send the user's username and password to the network provider (e.g., at the router address indicated by the activation response message). The client software may originate a POST operation to the above-described URL at the IP address implied by the logon URL at TCP port 443 utilizing an https (secure) connection over TCP. The POST parameters may be constructed by appending the arguments "username" and "password" to the {Query parameters} returned in the activation response HTML message. The contents of the username and password fields may be encoded as "text/plain," and the username may include the full NAI including appropriate roaming-partner prefixes. In one embodiment, the information may be formatted as shown in Table 3.

TABLE 3

| Field name | Type | Field naming/format specification (url encoded) | Required/ optional |
|---|---|---|---|
| Username input field | HTTP POST parameter | type="text" name="username" maxsize="128" | Required |
| Password input field | HTTP POST parameter | type="password" name="password" maxsize="128" | Required |

In 310, the network provider may then send the username and password to a roaming partner for authentication/authorization. The roaming partner is another network provider with whom the user subscribes for internet access.

In one embodiment, the industry-standard RADIUS mechanism may be used for authentication/authorization. When a valid login attempt is received from the client software, and the RADIUS username begins with a roaming-partner prefix of the form "ROAMING_PARTNER/", the network provider 162 may send a valid RADIUS authorization request (i.e., an Access-Request) to the AAA server 168*b* of the roaming partner 170 using standard RADIUS proxy procedures.

In 312, the roaming partner may determine whether the user account is authenticated (e.g., using the user's RADIUS-compliant username and password) and send an appropriate authentication response back to the network provider. In one embodiment, the roaming partner 170 may attempt to deliver the authorization request to the appropriate authentication authority. The roaming partner 170 may then return the response (typically Access-Accept or Access-Reject) returned by the authentication authority. In one embodiment, the roaming partner 170 will not return vendor-specific RADIUS attributes sent by the authentication authority. If no response is received from the authentication authority, the roaming partner 170 may return an Access-Reject response to the network provider 162.

If the authentication response indicates that the user account has not been authenticated, then the network provider may deny access to the network for the user in 314. If the authentication response indicates that the user account has been authenticated, then the network provider may authorize access to the network for the user in 316.

When the logon attempt is successful, an HTML authentication/authorization page is returned to the client. The page may contain an HTML comment string of the form "<!--error={error number}-->". The error number may be defined appropriately (e.g., 0=successful acceptance of request, 100=request rejected and login failed, 102=RADIUS communication error, and 255=undefined system error). New error numbers and definitions may be promulgated to roaming partners 170 by the network provider 162.

The authentication/authorization page may contain an HTML comment string of the form "<!--AuthMessage={reply message}-->". The {reply message} may include the RADIUS Reply-Message attribute when one is returned in an Access-Reply. The {reply message} may include another message (e.g., an error message) as defined by the network provider 162.

If the request was successful, the authentication/authorization page may include an HTML comment of the form "<!--SessionId={session key}-->". In one embodiment, the {session key} may include a unique alphanumeric string of at least one and not more than 20 characters. The session key may be cached by the client software until the session has been terminated.

The authentication/authorization page may also include a parameter which specifies the logout URL and is of the form "<!--LogoffUrl='https://<site-specific logouff URL>'-->". To initiate a logoff, the client software may send an HTTP POST operation to the system servicing the logoff URL. The POST operation may include the session key parameter returned by the last successful login operation.

When a logoff attempt is received by the network of the network provider 162, the router may return an HTML logoff response page including an HTML comment string of the form "<!--error={error number}—>". The error number may be defined appropriately (e.g., 0=successful logoff, 4=not logged in, and 255=undefined system error).

When a session is terminated in response to the expiration of a billing period, the network provider 162 may invalidate the session and emit a RADIUS Acct-Request (STOP). If the client session is active at the time of termination, the network provider 162 may immediately generate an Acct-Request (START). The Acct-Session-Id for the new session may be assigned a unique value.

Because it is possible for a user session to span several days in a per day billing scheme, the Acct-Multi-Session-Id attribute may be set to the initial Acct-Session-Id. This step may help ensure that the client logoff command works correctly because the initial Acct-Session-Id is cached at the client.

When a session expiration occurs because the client has not generated any network traffic for a defined "passive logout" interval, internet access authorization may be terminated. The user may then receive the custom welcome page on the next attempt to access any web page on the internet. The user may re-institute a network connection as described previously.

In one embodiment, a user may get a stop record with a session length of zero upon quickly disconnecting after authorization. This connection may still be charged to the user. In one embodiment, use of both a wired and a wireless access point may generate separately chargeable sessions.

When an Access-Request is not acknowledged by a matching Access-Accept or Access-Reject message, the network provider may resend the request. In one embodiment, the authentication retransmit interval may have a minimum of 10 seconds and a maximum of 20 seconds, and the authentication retry count may have a minimum of 3 and a maximum of 5.

The roaming system and method may also provide for session accounting. In 318, the network provider may keep an accounting of the user's access and bill the roaming partner accordingly. When a login completes successfully (i.e., when Access-Accept is returned), the network provider 162 may send a valid RADIUS Accounting-Request (START) message. The START message should be routed to the roaming partner 170 if and only if the roaming partner 170 brokered the successful authentication.

When an active session is terminated, the network provider 162 may forward a valid RADIUS Accounting-Request (STOP) message with the RADIUS Acct-Session-Time attribute indicating the duration of the session in seconds. The STOP message should be routed to the roaming partner 170 if and only if the roaming partner 170 brokered the successful authentication.

When an active session spans service billing periods, the network provider 162 may forward a valid RADIUS Acct-Request (STOP) message at the close of the billing period and immediately emit an Acct-Request (START) record. It is desirable that user access not be interrupted during this transition. In one embodiment, the new START record may include a unique Acct-Session-Id and an Acct-Multi-Session-ID attribute, where the Acct-Multi-Session-ID attribute is set to the Acct-Session-Id of the first expired session since the last Access-Request was accepted for the user at the particular access location.

The Acct-Request (STOP) packet may include a Vendor-Specific attribute (e.g., PEN=4552, Vendor-Type=3). The Vendor-Specific attribute may be set to the number of times the guest has connected to services through the network provider 162 during the current billing period. The roaming partner 170 may use this field to determine the number of user-billable days. The number of user-billable days may be calculated for both charging the user and for compensating the network provider 162. In one embodiment, a billable day will be incurred whenever the value of this field is at least 1.

In one embodiment, the network provider 162 may retransmit unacknowledged accounting requests for 7 days from the initial request transmission. The network provider 162 may retransmit unacknowledged accounting requests at least once each hour during the first 24 hours and at least once every 6 hours thereafter. In one embodiment, the accounting retransmit interval may have a minimum of 20 seconds and a maximum of 6 hours, and the accounting request retry period may have a minimum of 7 days.

It is recommended that the roaming partner 170 acknowledge (i.e., send an Acct-Response message) any Acct-Request received from the network provider 162 to ensure that session-state desynchronization between the roaming partner 170 and the network provider 162, or a RADIUS implementation or configuration error by either party, does not lead to an accumulation and continuous retransmission of unacknowledged requests.

In embodiment, the network provider 162 may return particular values for Acct-Terminate-Cause under conditions listed in Table 4.

TABLE 4

| Condition | Value | Value name |
|---|---|---|
| User logout | 1 | User request |
| Access link down | 2 | Lost carrier |
| Idle timeout | 4 | No activity |
| Max session time exceeded | 5 | Session terminated at conclusion of service billing period |
| Orderly shutdown of network provider access point or following unexpected system restart | 7 | Admin reboot |

In one embodiment, the network provider 162 may provide a periodic (e.g., monthly) invoice summarizing the charges owed by each party. The billing period for invoices may begin, for example, at midnight GMT on the first day of each calendar month and may end immediately before the beginning of the next billing period.

Whereas RADIUS AAA with username and password is one method of providing AAA services, there are other methods available in various embodiments. For example, another industry standard method is CHAP (Challenge Handshake Authentication Protocol). Interaction with CHAP is typically more complex than RADIUS in that a challenge has to be presented and accepted. This interaction can be accomplished in either a web-based system or in a client-software-based system. In the case of a web-based system, the preferred embodiment is to provide a CHAP challenge calculation in the web browser, using a "plug-in," a web browser scripting language such as JavaScript or ActiveX, or a pre-compiled binary such as a Java Applet. Specifically, in the authentication steps, the following is a preferred embodiment:

1) The Login Webserver displays (via HTTPS) a login page which requests a username and password from the End User.

At this point, a "CHAP Challenge" is embedded into the HTML page returned by the Login Webserver, which will be used by JavaScript in the page to hash the user's password before transmission of the web form submission to the web server.

2) The End User fills-in the username/password fields and clicks the form submission button. This button results in a form submission via HTTPS to the Login Webserver.

At this point, instead of directly submitting the entered data, a JavaScript function may be used to hash the End User's password using the "CHAP Challenge" embedded in the HTML, or the JavaScript function itself, and submit the hashed password instead of the plaintext password.

This system has the added security advantage of the password never leaving the client machine.

To provide for the options listed in Table 1 and the appropriate roaming sponsor responses, the pricing and option information can be communicated via RADIUS Vendor Specific Attributes, as above, or can be encoded into HTML or XML fields for a server to read.

Figure 11:
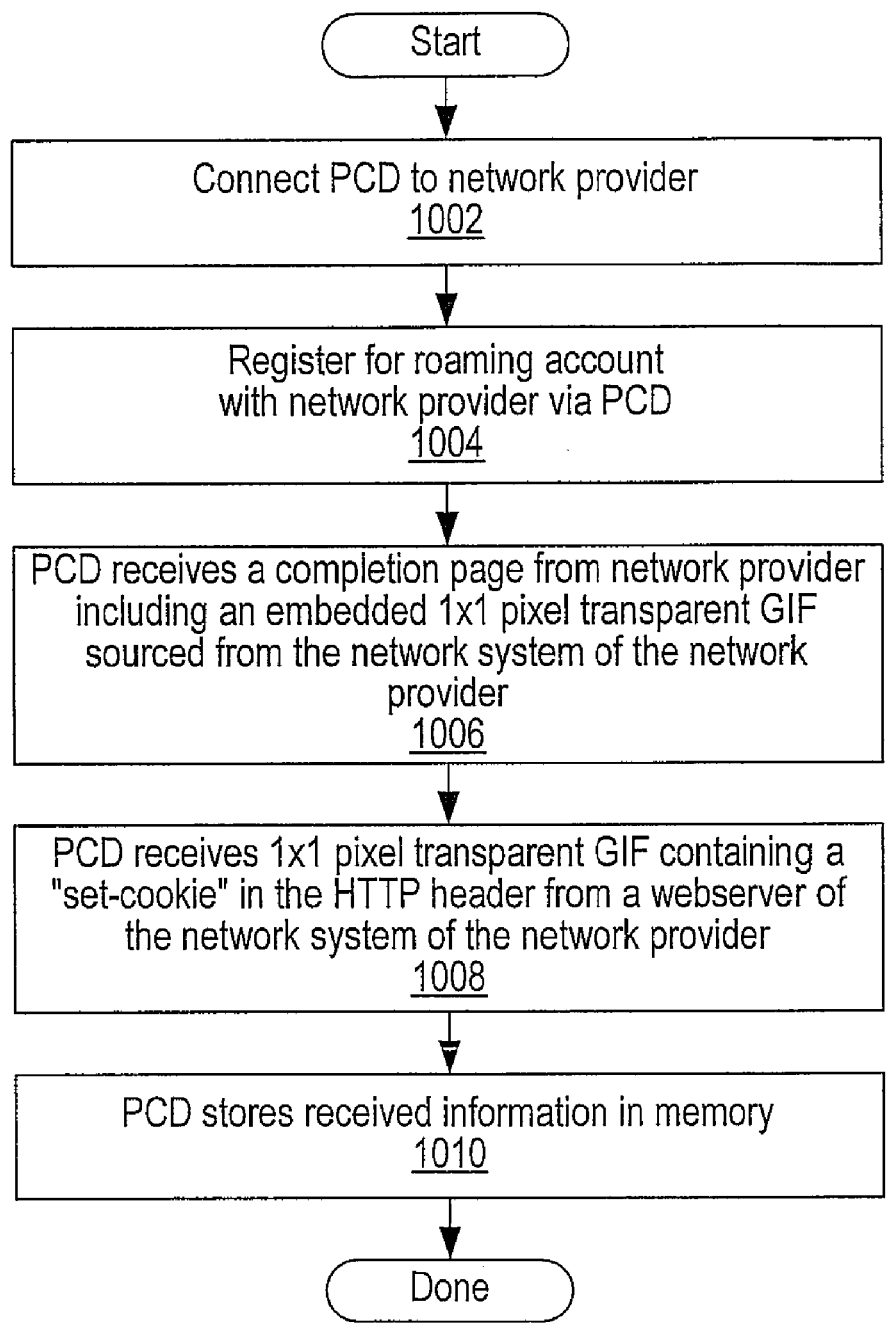
FIG. 11 is a flowchart diagram illustrating a subscriber registration process using PCD identification according to one embodiment.
Figure 12:
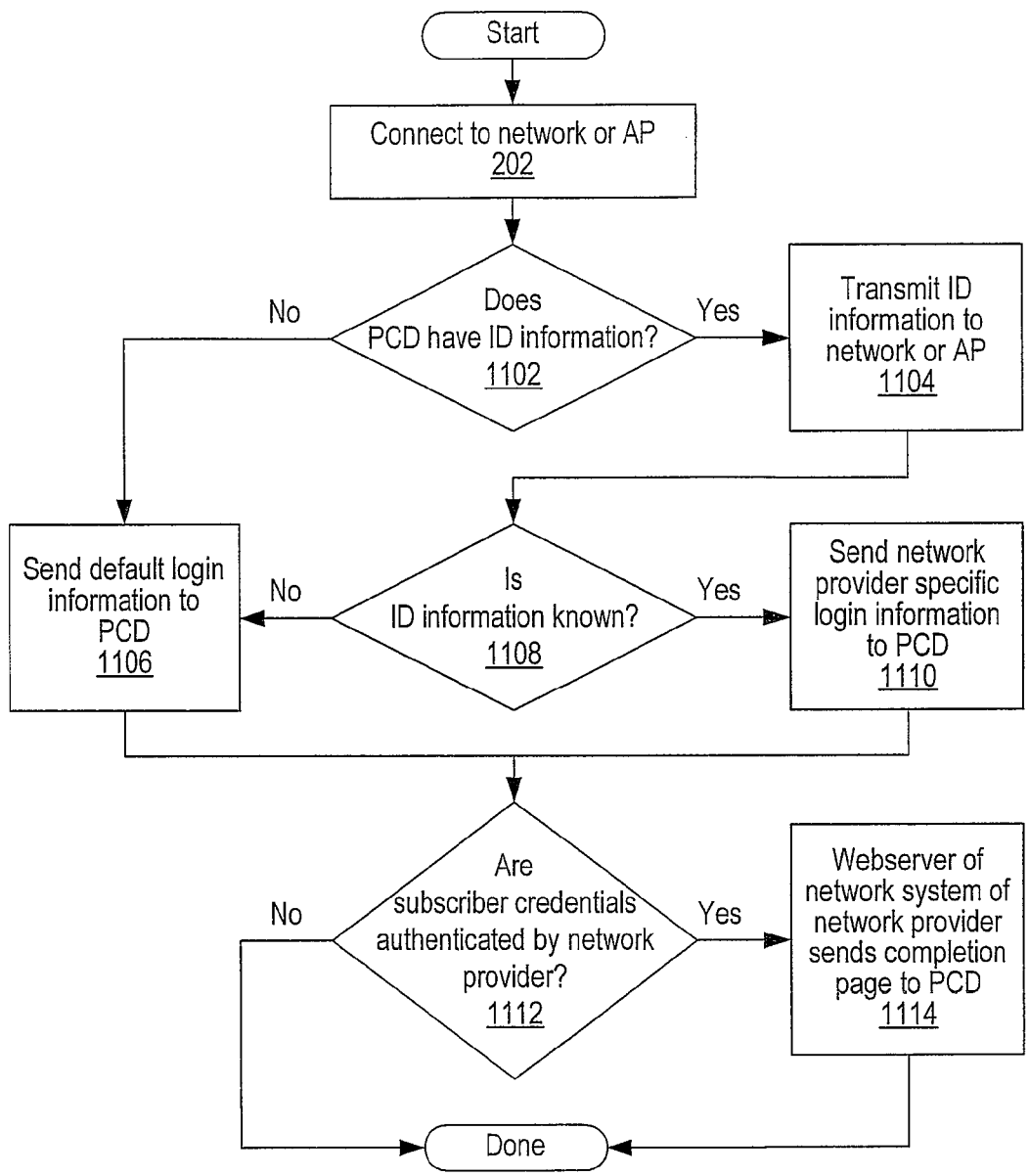
FIG. 12 is a flowchart diagram illustrating a method for identifying a PCD as a subscriber to a network provider according to one embodiment.
Figure 13:
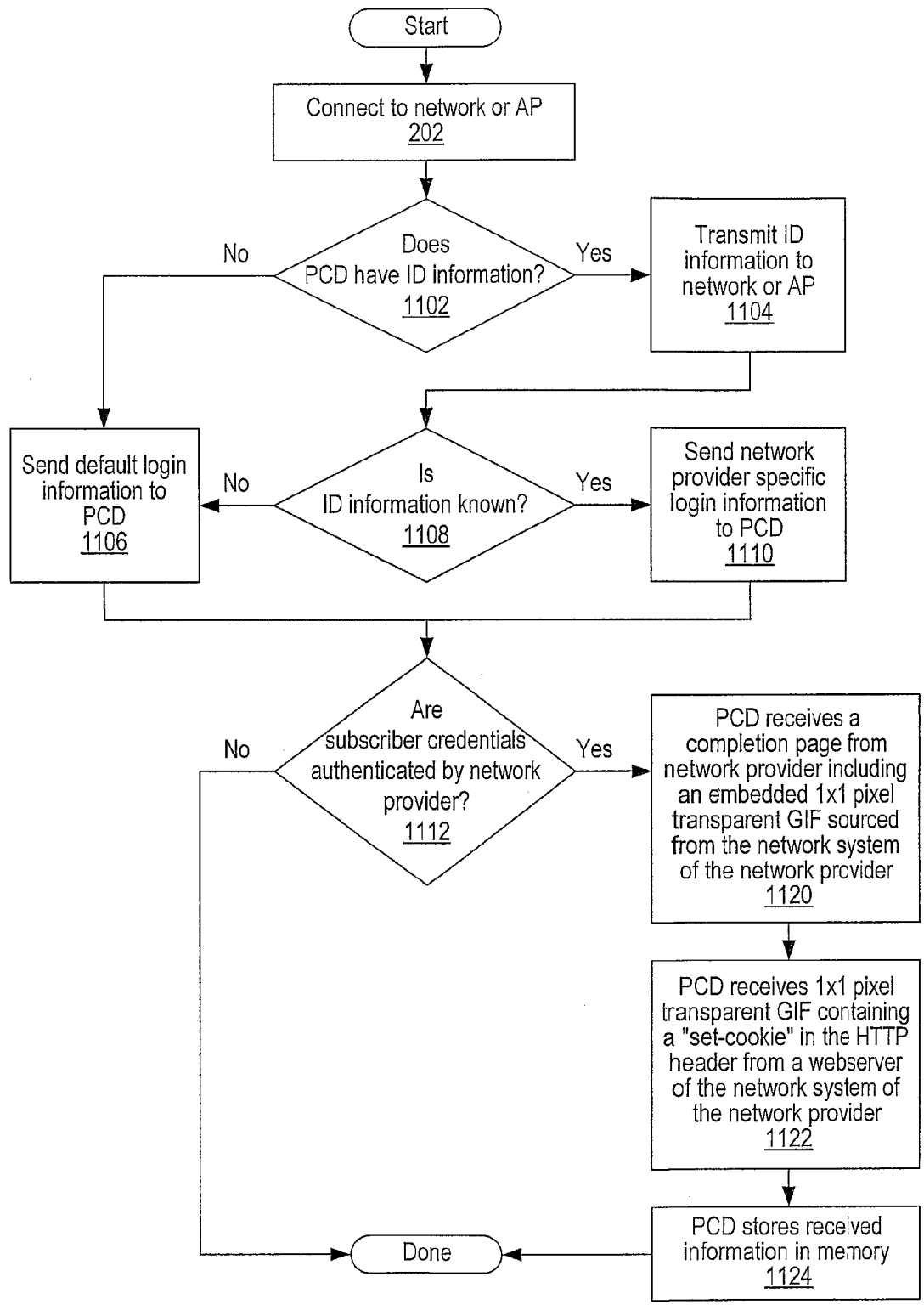
FIG. 13 is a flowchart diagram illustrating a method for identifying a PCD as a subscriber to a network provider according to one embodiment.

FIGS. 11 through 13—Network Access Using Persistent PCD Identification

In one embodiment, the network access system and method may include the "marking" of a PCD by a network provider for later identification of the PCD. After subscribing to a particular network provider using a PCD, the PCD may store a network system identifier in its memory. The network system identifier comprises data which may identify the particular network provider. This identification mechanism may enable a browser or client that is executed on the PCD 110 to identify its user as a subscriber of the network provider. In a preferred embodiment, using this identification information of the PCD 110, the network may determine the services of the network access system available to the PCD.

In a preferred embodiment of the system and method for persistently identifying a subscriber, the client is a web browser. In this embodiment, the identification mechanism may be especially useful where the network system is a neutral host Internet service provider, which is not a part of the same domain (e.g., wayport.net) as the clearing house, and where at least one of a plurality of network providers desires a custom login or splash page for its subscribers.

FIG. 11 is a flowchart diagram illustrating a subscriber registration process using persistent PCD identification according to one embodiment. In 1002, the user may connect the PCD 110 to the network provider to subscribe or register for network access. The means for connecting the PCD 110 to the network provider may comprise an Internet connection, an Intranet connection, a dial-in connection, a cellular connection, or any other suitable connection. In one embodiment, the PCD 110 may use web browser software or another network client to connect to a web server of the network provider using communication protocols such as HTTP and/or HTTPS.

Next, in 1004, the user may register as a subscriber of the particular network provider. In subscribing, the user may submit identification information (e.g., the user's name, address, phone number, e-mail address, etc.), billing information (e.g., a credit card number, debit card number, bank account number, billing address, etc.), and/or other appropriate information. Upon subscription, the user may be able to access the internet from a variety of venues by using the particular network provider as a roaming partner, as discussed with reference to FIGS. 4 through 10.

In 1006, the PCD 110 may receive a subscription-successful completion page from the network provider. The page may be implemented using one or more markup languages such as HTML. The page may be generated and sent by a web server operated by the network provider. In one embodiment, a one-by-one pixel transparent GIF or other suitable file may be embedded in the completion page. The transparent GIF is sourced by the client from the web server operated by the network provider. Using the transparent GIF or other suitable file, the PCD may obtain or generate a network system identifier. For example, the GIF may include, in its HTTP header, information which instructs the browser software to set a cookie in 1008. The cookie may comprise information to establish that the PCD 110 is used by a subscriber of the particular network provider.

Next, in 1010, the network system identifier (e.g., the cookie information) may be stored in a memory of the PCD 110. For example, the cookie may be stored in persistent memory such as a hard drive. The cookie may typically be stored as a text file. In one embodiment, the file name of the cookie may identify a network address (e.g., web server address) of the network provider, and the contents of the cookie may further describe terms of the subscription (e.g., a username of the user). As will be further illustrated in FIGS. 12 and 13, the cookie may be used by the browser or by other pieces of software to identify the user of the PCD as a subscriber to the particular network provider.

In one embodiment, the network access system and method may include the "marking" of a PCD by a "clearing house" of a network provider for later identification of the PCD. The network system may comprise a list of domains from a plurality of clearing houses used to "mark" the PCD. Because a mechanism (e.g., using a cookie) for marking a PCD may be tied to a domain of a web server of a clearing house, the network system may serially present the list of domain names to the web browser of the PCD. Therefore, the web browser may communicate its cookie set by the domain of the clearing house. This mechanism may be useful, for example, because a web-based cookie that is set by a particular domain (e.g., yahoo.com) may only be communicated to that domain (e.g., yahoo.com). By this, the cookie set by the domain wayport.net may not be transmitted to a domain such as wayport.net. With this cycling of domain names to the web browser, the network system may hi-jack or spoof a particular domain (e.g., yahoo.com) to obtain the cookie set by that domain (e.g., yahoo.com) to determine the marking of the PCD.

FIG. 12 is a flowchart diagram illustrating a method for identifying a PCD as a subscriber to a network provider according to one embodiment. In 202, the user connects to a network or AP as discussed above. Next, in 1102, the PCD 110 may determine if it has ID information to send to the network or AP. The ID information may be included in the network system identifier stored in the memory in 1010 of FIG. 11. If not, then the PCD 110 may not send any ID information and may consequently receive default login information (e.g., a default login web page) in 1106.

If, however, the PCD does have appropriate ID information, then in 1104 the PCD 110 may transmit the ID information to the network or AP. The ID information (e.g., as stored in the network system identifier) may identify the user of the PCD as a subscriber to a particular network provider. In 1108, the network (e.g., the web server of the network provider) or AP may determine if the ID information is known. If the ID information is not known, then the PCD 110 may receive the default login information from the network or AP in 1106. If the ID information is known, then in 1110 the network or AP may send a login page, specific to the network provider, to the PCD 110.

In 1112, it may be determined whether or not the subscriber's credentials are authenticated with the network provider. In 1112, the network or AP may perform steps of authentication and/or authorization as discussed previously. If authentication of the subscriber fails, then the process ends. If authentication is successful, then the PCD receives a completion page from the network or AP in 1114.

FIG. 13 is a flowchart diagram illustrating an alternative method for identifying a PCD as a subscriber to a network provider according to one embodiment. Steps 202, 1102, 1104, 1106, 1108, 1110, and 1112 may be performed substantially as described with reference to FIG. 12.

In 1120, the PCD 110 may receive a completion page from the network or AP. The page may be implemented using one or more markup languages such as HTML. The page may be generated and sent by a web server operated by the network provider. In one embodiment, a one-by-one pixel transparent GIF or other suitable file may be embedded in the completion page. The transparent GIF is sourced by the client from the web server operated by the network provider. Using the transparent GIF or other suitable file, the PCD may obtain or generate a network system identifier. For example, the GIF may include, in its HTTP header, information which instructs the browser software to set a cookie in 1122. The cookie may comprise information to establish that the PCD 110 is used by a subscriber of the particular network provider.

Next, in 1124, the network system identifier (e.g., the cookie information) may be stored in a memory of the PCD 110. For example, the cookie may be stored in persistent memory such as a hard drive. The cookie may typically be stored as a text file. In one embodiment, the file name of the cookie may identify a network address (e.g., web server address) of the network provider, and the contents of the cookie may further describe terms of the subscription (e.g., a username of the user). The cookie may be used by the browser or by other pieces of software to identify the user of the PCD as a subscriber to the particular network provider.

While the present invention has been described with reference to particular embodiments, it will be understood that the embodiments are illustrative and that the invention scope is not so limited. Any variations, modifications, additions, and improvements to the embodiments described are possible. These variations, modifications, additions, and improvements may fall within the scope of the inventions as detailed within the following claims.

The invention claimed is:

1. A method for providing access to a network, the method comprising:
   initiating communication between a computing device and a network, wherein the computing device is coupled to the network through an access point at a geographic location;
   determining, by a computer, different levels of services that apply at the geographic location;
   delivering a first level of service, among the different levels of services, over the network to the computing device;
   presenting one or more of the different levels of services for selection by a user of the computing device, wherein the one or more of the different levels of services presented to the user are dependent upon (i) a service set identifier (SSID) for the network received from the computing device and (ii) a roaming partner associated with the user of the computing device; and
   transforming, by the computer, the first level of service delivered to the computing device to a second level of service selected by the user, among the different levels of services, delivered over the network to the computing device.

2. The method of claim 1, wherein two or more levels of service of the different levels of services are offered at different prices.

3. The method of claim 1, further comprising billing a roaming partner associated with the user for the level of service selected by the user.

4. The method of claim 1, wherein determining comprises determining the one or more different levels of services dependent upon the geographic location of the user.

5. The method of claim 1, wherein the geographic location is identified by a geographic location of a building where the computing device is located, and wherein determining different levels of services apply at the geographic location comprises determining what different levels of services apply at the building.

6. The method of claim 1, wherein the one or more of the different levels of services presented to the user are dependent upon identification information received from the computing device.

7. The method of claim 6, wherein the identification information indicates a virtual local area network (ULAN), over which the computing device communicates with the network.

8. A system comprising:
   a plurality of access points coupled to a network, wherein at least one of the plurality of access points is operable to communicate with a computing device; and
   a network provider server communicatively coupled to a network, wherein the network provider server is operable to perform:
      initiating communication between a computing device and a network, wherein the computing device is coupled to the network through an access point of the plurality of access points at a geographic location;

determining different levels of services that apply at the geographic location;

presenting one or more of the different levels of services for selection by a user of the computing device, wherein the one or more of the different levels of services presented to the user are dependent upon (i) a service set identifier (SSID) for the network received from the computing device and (ii) a roaming partner associated with the user of the computing device; and delivering a level of service selected by the user, among the different levels of services, over the network to the computing device.

9. The system of claim 8, wherein two or more levels of service of the different levels of services are offered at different prices.

10. The system of claim 8, further comprising billing a roaming partner associated with the user for the level of service selected by the user.

11. The system of claim 8, wherein determining comprises determining the one or more different levels of services dependent upon the geographic location of the user.

12. The system of claim 8, wherein the geographic location is identified by the geographic location of a venue where the computing device is located.

13. The system of claim 8, wherein the one or more of the different levels of services presented to the user are dependent upon identification information received from the computing device.

14. The system of claim 13, wherein the identification information indicates a virtual local area network (VLAN) over which the computing device communicates with the network.

15. A program product comprising a non-transitory machine-readable medium including program logic therein that when executed cause the functions of:

initiating communication between a computing device and a network, wherein the computing device is coupled to the network through an access point at a geographic location;

determining different levels of services apply at the venue;

presenting one or more of the different levels of services for selection by a user of the computing device, wherein the one or more of the different levels of services presented to the user are dependent upon (i) a service set identifier (SSID) for the network received from the computing device and (ii) a roaming partner associated with the user of the computing device; and delivering a level of service selected by the user, among the different levels of services, over the network to the computing device.

16. The program product of claim 15, wherein two or more levels of service of the different levels of services are offered at different prices.

17. The program product of claim 15, further comprising billing a roaming partner associated with the user for the level of service selected by the user.

18. The program product of claim 15, wherein determining comprises determining the one or more different levels of services dependent upon the geographic location of the user.

19. The program product of claim 15, wherein the geographic location is identified by the geographic location of a venue where the computing device is located.

20. The program product of claim 15, wherein the one or more of the different levels of services presented to the user are dependent upon identification information received from the computing device.

* * * * *